United States Patent [19]

Gomez et al.

[11] 4,313,700

[45] Feb. 2, 1982

[54] FARE COLLECTION SYSTEM AND COMPONENTS THEREOF

[75] Inventors: Jim H. Gomez, Kankakee; Jose E. Davila, Bourbonnais, both of Ill.

[73] Assignee: Transit Systems Technology, Inc., Kankakee, Ill.

[21] Appl. No.: 149,844

[22] Filed: May 14, 1980

Related U.S. Application Data

[62] Division of Ser. No. 855,970, Nov. 30, 1977, Pat. No. 4,210,801.

[51] Int. Cl.[3] .............................................. B65G 51/02

[52] U.S. Cl. ..................................... 406/156; 209/143

[58] Field of Search ............ 209/534, 143, 145, 21-23, 209/26, 27, 147; 406/154, 156, 157, 163, 168, 169, 171, 174, 12, 84; 232/7, 9, 15, 16, 64, 66; 235/92 CN

[56] References Cited

U.S. PATENT DOCUMENTS

| | | | |
|---|---|---|---|
| 2,477,160 | 7/1949 | Arnold | 209/143 |
| 3,843,203 | 10/1974 | Golland et al. | 406/12 |

*Primary Examiner*—Ralph J. Hill

*Attorney, Agent, or Firm*—Dithmar, Stotland, Stratman & Levy

[57] ABSTRACT

Slowdown mechanism is provided in a fare collection system pneumatically conveying coin and paper money from a fare box to a storage vault. The air stream carrying the contents of the fare box is conveyed into the top of a downwardly inclined slowdown chamber having an outlet door at the lower end thereof. Paper is drawn off from the slowdown chamber upwardly through a paper-air conduit. A valve is disposed between the slowdown chamber and the outlet door thereof. Automatic control mechanism opens the valve and the door when paper is being conveyed from the fare box, closes the valve and door when coins are being conveyed and opens the valve and door to empty coins from the slowdown chamber into the associated storage vault.

5 Claims, 45 Drawing Figures

FIG. 9
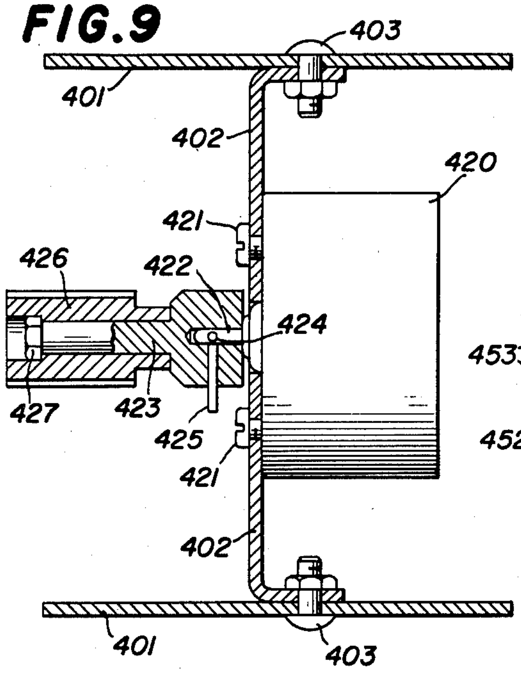
FIG. 10
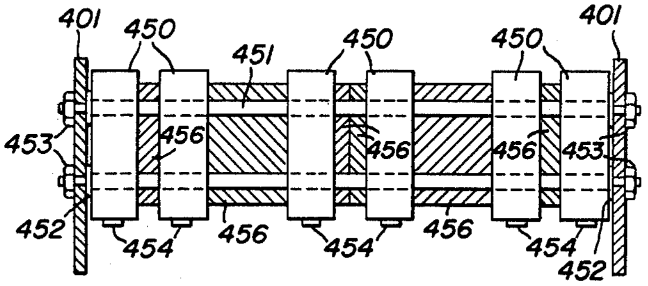
FIG. 11
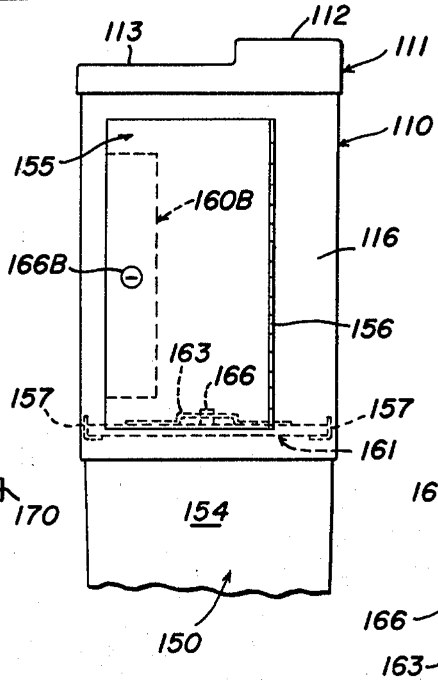
FIG. 11A
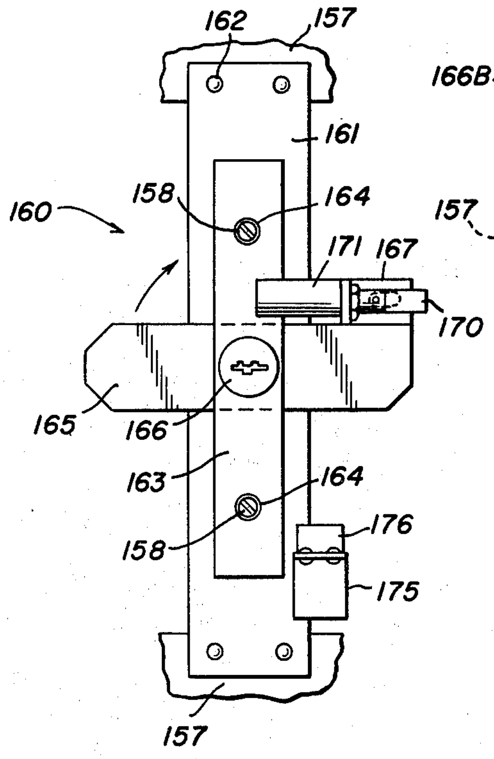
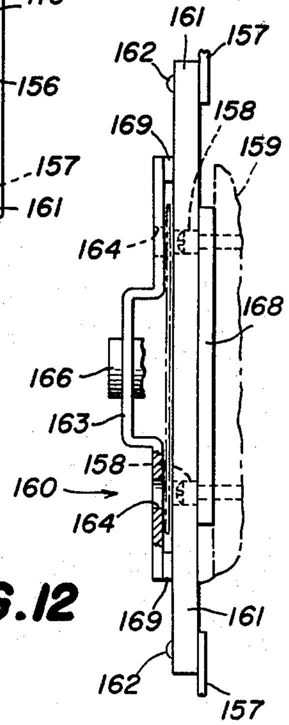
FIG. 12

330

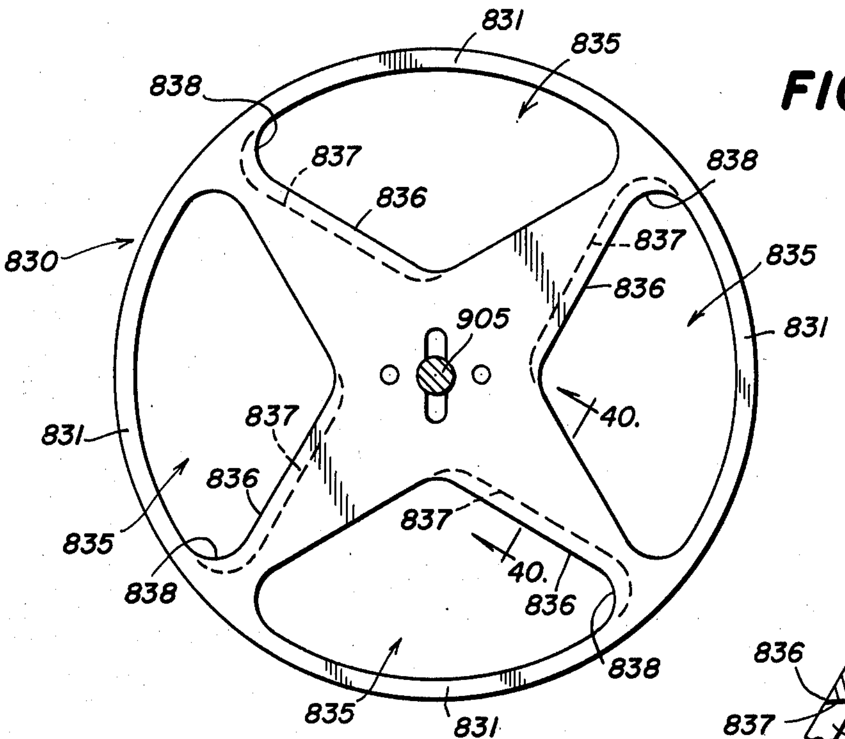
FIG. 39
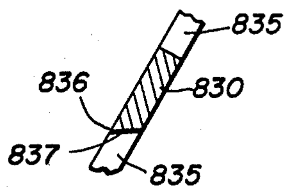
FIG. 40
FIG. 41
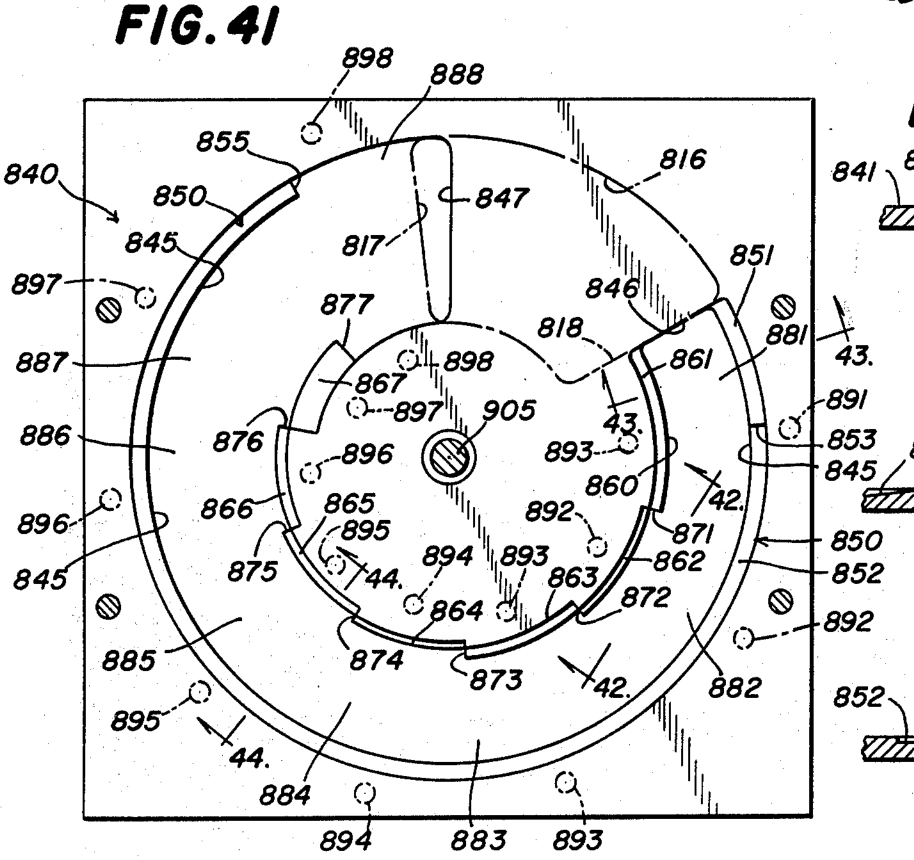
FIG. 43
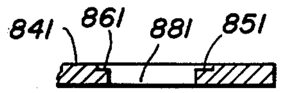
FIG. 42
FIG. 44
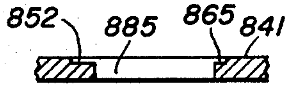

FARE COLLECTION SYSTEM AND COMPONENTS THEREOF

This is a division of application Ser. No. 855,970, filed Nov. 30, 1977, now U.S. Pat. No. 4,210,801.

BACKGROUND OF THE INVENTION

The present invention relates generally to improvements in fare collection systems and components thereof, and specifically to the provision of a more secure fare collection system which separately handles and counts paper including paper currency and paper transfers and tickets, and coins including coin currency and tokens.

In one form of standard fare collection system used heretofore a fare box was provided for each individual bus, the fare box counting and recording the coins as deposited, there being no facility for accepting paper of any type. At the end of a work shift, the bus would be taken to a central location where the contents of the fare box were removed with security precautions by pneumatic means to a central processing unit where the coins were simply separated from the air stream and dropped into a secure vault. An example of such a system is illustrated in U.S. Pat. No. 3,843,203 granted Oct. 22, 1974 to Golland et al. The fare box of such a system is mechanically complicated and expensive to manufacture, whereby it is available only to major systems having at least 100 or more buses therein. The complicated fare box frequently jams and presents severe service. problems during use. Although the pneumatic withdrawal of the contents of the fare box is supposedly under secure conditions, practice has shown that the measures taken are not sufficient absolutely to prevent unauthorized withdrawal of fares from the fare box. There is no secure method of handling the paper including paper currency and paper transfers and tickets. Passenger fare classification is also often not accurately recorded. The system further is not secure against forceable entry, and forceable entry may take place without any warning to management that such forceable entry has occurred.

Another collection system is illustrated in U.S. Pat. No. 3,147,839 granted Sept. 8, 1964 to White. This system collects coins from stationary boxes in parking meters using a mobile pneumatic extractor with coin sorter and counter and secure storage vaults. Such systems provide only a single count of the coins and makes no provision for handling paper of any type. There furthermore are no security measures taken to prevent unauthorized use of the system and no security measures taken to alarm management when unauthorized entry is made to the individual parking meters.

Prior fare boxes are illustrated in U.S. Pat. No 420,265 granted Jan. 28, 1890 to Bricker, U.S. Pat. No. 1,032,876 granted July 16, 1912 to Bucknam and U.S. Pat. No. 2,079,255 granted May 4, 1937 to Jones. None of these prior fare boxes provide the security of the fare box of the present invention, and none of these fare boxes are equipped to handle paper and to sort, measure and count the same.

Exemplars of coin sorting and counting devices utilized heretofore are illustrated in U.S. Pat. No. 1,095,981 granted May 5, 1914 to Farrell, U.S. Pat. No. 1,655,412 granted Jan. 10, 1928 to Donnellan and U.S. Pat. No. 2,289,002 granted July 2, 1942 to Fleming et al. None of these prior coin sorter-counters can rapidly sort and count the contents of a bus fare box in a few seconds so as to count the fare boxes one-by-one accurately and without jamming.

SUMMARY OF THE INVENTION

The present invention provides an improved fare collection system and components thereof which can quickly and rapidly process the collection and storage of fares on the bus, with counting and recording of both paper and coin, if desired, together with secure safekeeping of the contents of the fare box followed by secure pneumatic removal of the contents to a central processing unit with the paper and coin utilizing the same conduit, the paper being fed first and separated from the air stream and placed into a storage vault and the coins being fed subsequently and to a rapid sorter-counter-recorder before entry into a secure storage vault.

This is accomplished in the present invention, and it is an object of the present invention to accomplish these desired results, by providing a fare collection system including a plurality of mobile fare boxes and a stationary central processing unit, each of the fare boxes having a collection chamber for receiving fares therein, an acceptor coupling on each of the fare boxes providing access to the contents of the associated chamber, and an extractor conduit having one end in communication with the central processing unit and an extractor coupling on the other end thereof, the extractor coupling cooperating with each of the acceptor couplings to provide a communication between the associated chamber and the central processing unit for conveying the contents of the chamber to the central processing unit, and a sorter-counter-recorder in the central processing unit for sorting, counting and recording the contents of each of the fare boxes one-by-one.

Another object of the invention is to provide in a fare collection system of the type set forth a counter-recorder in each fare box for counting and recording the fares as the fares are deposited in the associated chamber, whereby to provide two counts of the fares for comparison.

Yet another object of the invention is to provide in a fare collection system of the type set forth a separate coin collection chamber and a separate paper collection chamber in each of the fare boxes, and a paper separator in the central processing unit for collecting the paper conveyed from the paper collection chamber.

Still another object of the invention is to provide in a fare collection system of the type set forth equipment for generating an air stream so as pneumatically to convey the contents of the fare box to the central processing unit, and pulsing mechanism for pulsing the air stream during the conveyance of the contents of the fare box to provide a controlled and non-clogging flow thereof.

Yet another object of the invention is to provide in a fare collection system of the type set forth means for decreasing the air flow during the conveying of paper from the paper collection chamber and means for increasing the air flow during the conveying of coins from the coin collection chamber and means for decreasing the air flow during the discharge of coins into the storage vault therefor.

Still another object of the invention is to provide in a fare collection system of the type set forth a counter-recorder in each fare box for counting and recording the paper entering the associated paper collection chamber including paper currency and paper transfers and tickets.

Yet another object of the invention is to provide in a fare collection system of the type described both a counter-recorder for paper and a counter-recorder for coins in each fare box.

Still another object of the invention is to provide in a fare collection system of the type set forth a data storage unit in each fare box and means in the extractor coupling to extract the data from each data storage unit and convey the same to the central processing unit.

Yet another object of the invention is to provide in a fare collection system of the type set forth a security plate shiftably mounted on each of the fare boxes and shiftable between a blocking position blocking the acceptor coupling to prevent access to the fare chamber and a coupling position clearing the acceptor coupling to provide access to the fare chamber, a lock mechanism having a first condition holding the security plate in the blocking position thereof, and having a second condition releasing the security plate for shifting to the coupling position thereof, and a control circuit including security sensing means and operable upon engagement of the couplings and sensing of a secure condition by the security sensing means to operate the lock mechanism to the second condition thereof releasing the security plate for shifting to the coupling position thereof, thus to convey the contents of the chamber to the central processing unit.

Still another object of the invention is to provide a fare collection system of the type set forth wherein a first security plate is shiftably mounted on each of the fare boxes and shiftable between a blocking position blocking the acceptor coupling to prevent access to the chamber and a coupling position clearing the acceptor coupling to provide access to the chamber, and a second security plate shiftably mounted on the extractor coupling and shiftable between a blocking position blocking the extractor coupling to prevent access to the extractor conduit and a coupling position clearing the extractor coupling to provide access to the extractor conduit.

Yet another object of the invention is to provide in a fare collection system of the type set forth a slowdown chamber mounted in the central processing unit and inclined to the horizontal and having an inlet and an outlet with the inlet disposed higher than the outlet and connected to the extractor conduit for receiving the air stream and the contents of the fare box chambers, a paper-air conduit connected to the slowdown chamber intermediate the ends thereof and extending upwardly therefrom for receiving a portion of the air stream and the paper drawn from the paper collection chamber, and a door closing the outlet for collecting coins thereagainst after which the door is opened to deposit the coins in a sorter-counter-recorder.

Further objects of the invention are to provide an improved fare box, an improved paper counter-measurer, an improved extractor coupling, an improved slowdown mechanism and paper slower/separator, an improved sorter-counter for coins in the central processing unit and an improved coin registering device in the fare box, all for use in a fare collection system of the type set forth.

Further features of the invention pertain to the particular arrangement of the components of the fare collection system and the particular arrangement of the parts of the individual components of the fare collection system, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 9 is a view in section along the line 9—9 of FIG. 5;

FIG. 10 is a view in section along the line 10—10 of FIG. 5;

FIG. 11 is a side elevational view of the upper end of the fare box of FIG. 2 showing the access door therein and the mounting of the security locking device therefor and the security locking device securing the top to the pedestal of the fare box;

FIG. 11A is an enlarged view of one of the security locking devices illustrated in FIG. 11

FIG. 12 is a side view of the security locking device of FIG. 11A;

FIG. 39 is a view in section along the line 39—39 of FIG. 35 and illustrating the coin carrier;

FIG. 40 is a view in section along the line 40—40 of FIG. 39;

FIG. 41 is a view in section along the line 41—41 of FIG. 35 and illustrating the selector plate;

FIG. 42 is a view in section along the line 42—42 of FIG. 41;

FIG. 43 is a view in section along the line 43—43 of FIG. 41; and

FIG. 44 is a view in section along the line 44—44 of FIG. 41.

DESCRIPTION OF THE PREFERRED EMBODIMENTS

Figure 1:
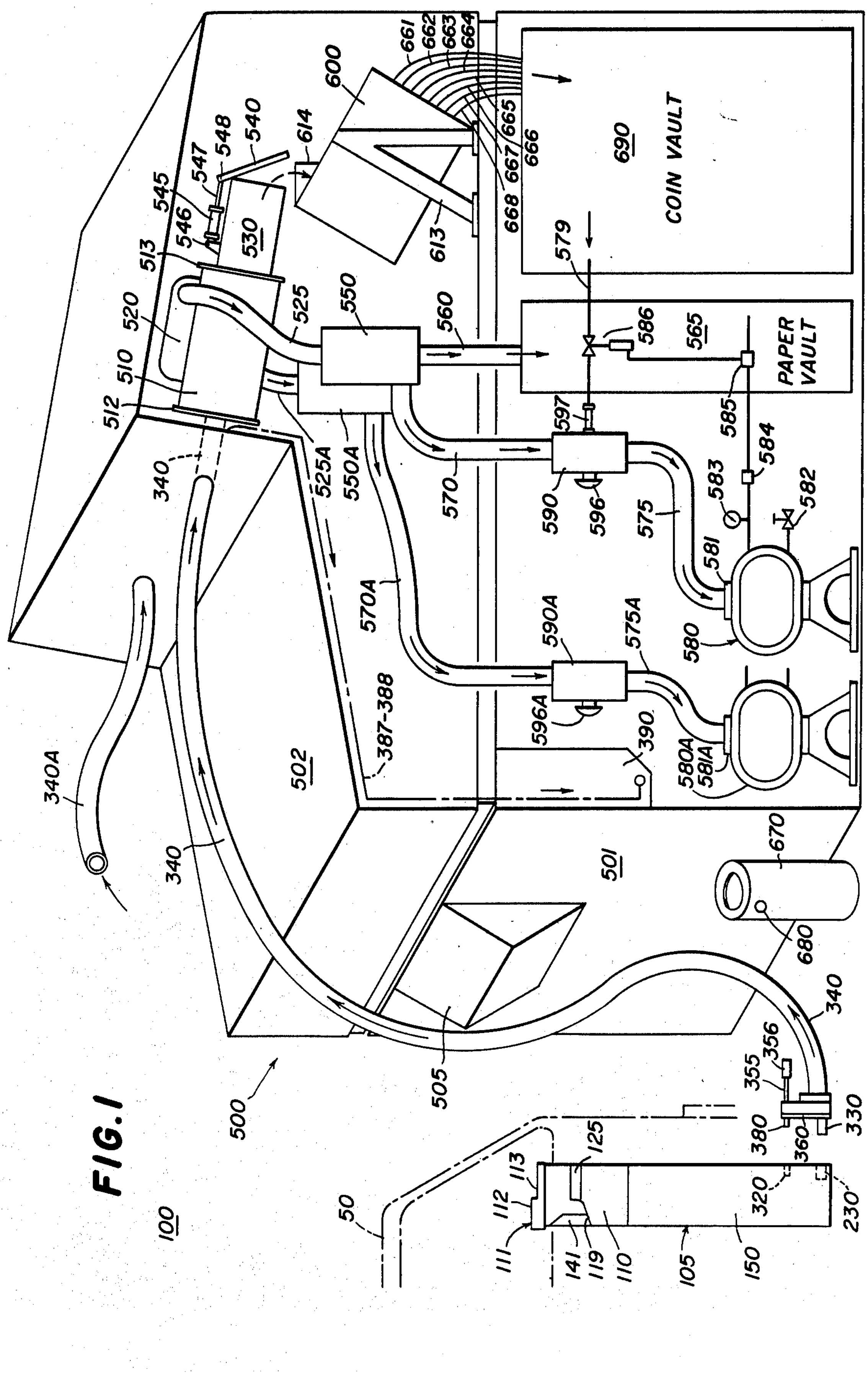
FIG. 1 is a diagrammatic view of a preferred embodiment of a fare collection system made in accordance with and embodying the principles of the present invention, the system being illustrated as comprising a plurality of individual fare boxes disposed in vehicles such as buses and a central processing unit located at a central point.

Referring to FIG. 1 of the drawings, there is diagrammatically illustrated a fare collection system 100 made in accordance with and embodying the principles of the present invention, the system 100 including a plurality of fare boxes 105 typically mounted at the entry to a bus 50 and a central processing unit 500 containing two sets of processing equipment. A passenger entering the bus 50 deposits his fare in the fare box 105, coins being delivered to a coin collection chamber therein and paper such as currency and transfers and tickets being delivered to a paper chamber therein. Access is had to the coin and paper chamber through an acceptor coupling 230 on the side of the fare box 105, and electronic data generated and stored in the fare box 105 is available at a data transmission connection 320.

In order to extract the fares and data from the fare box 105, an extractor coupling 330 is provided and including a data connector 380. The extractor coupling 330 is stored in a post 670 and can be removed only after actuating a lock 680. The coins and paper are pneumatically conveyed through a hose 340 to the central processing unit 500, it being understood that two of the extractor couplings 330 are provided on the central processing unit 500, the second extractor coupling being connected to a hose 340A.

Within the central processing unit 500, the paper and coins are first fed to a slowdown chamber 510 where the paper is drawn into a paper chamber 520 and then through a hose 525 to a paper slower/separator 550, the paper falling through a hose 560 into a secure paper vault 565. The air from the paper slower/separator is conveyed by hose 570 through a pulsing valve 590 and a hose 575 to a vacuum pump 580. The coins arriving in the slowdown assembly 510 are fed to an escrow 530, and after the collection of all the coins from a bus 50, an escrow door 540 that has heretofore been closed is opened by a motor 545 and the coins dumped into a coin sorter-counter 600. The sorted and counted coins are then fed through suitable tracks 661 to 668 into separate compartments in a secure coin vault 690. The data extracted via the data transmission connection 320 and the data connector 380 is conveyed by conductors to a central processing unit data storage facility 390. It will be appreciated that all of the equipment within the central processing unit 500 is duplicated, and the second set of equipment has had the same reference numerals applied thereto as the first set of equipment with the addition of the suffix "A" thereto.

Figure 2:
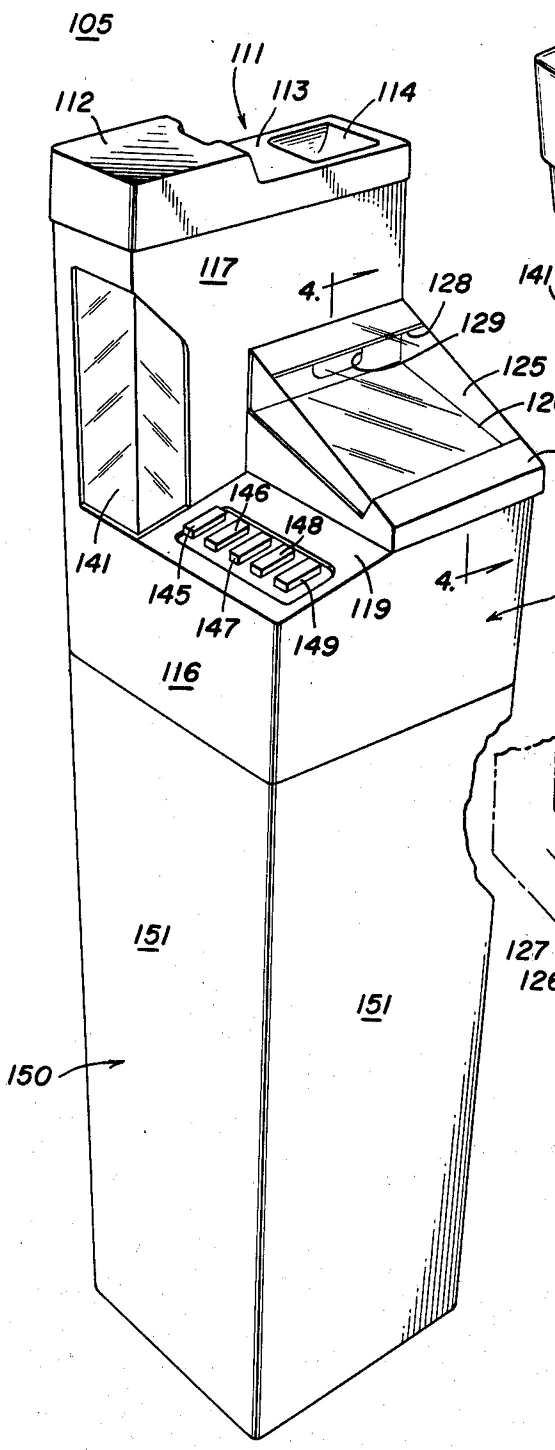
FIG. 2 is a perspective view of a fare box forming a part of the fare collection system of FIG. 1.
Figure 3:
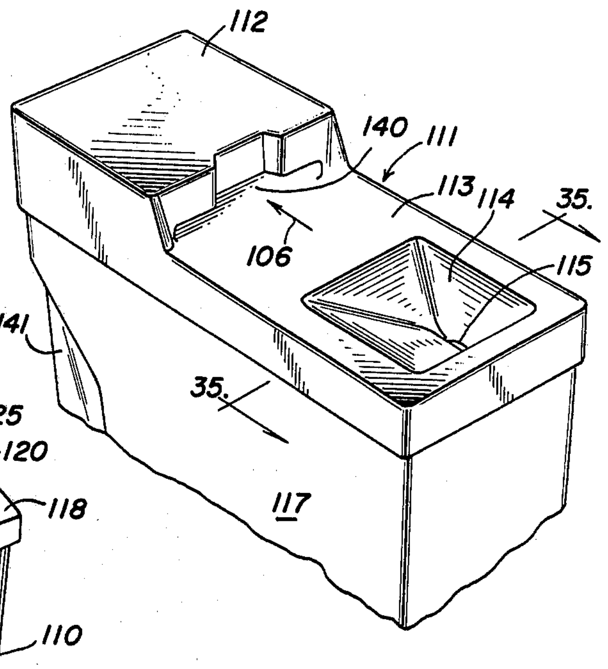
FIG. 3 is an enlarged view of the upper portion of the fare box of FIG. 2 and illustrating the coin entry slot and the paper entry slot therein.
Figure 4:
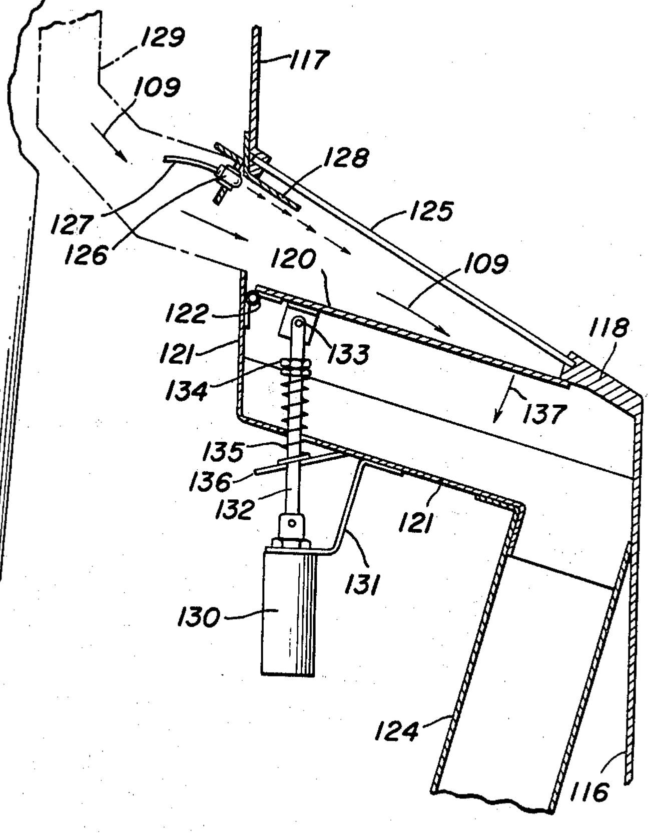
FIG. 4 is an enlarged view in section through the upper portion of the fare box along the line 4—4 of FIG. 2 and illustrating the coin dump assembly.

Referring to FIGS. 2 to 18 of the drawings, additional details of the construction of the fare box 105 will be given. As is best illustrated in FIGS. 2 and 3, the fare box 105 includes a top 110 having a feeding head 111 thereon, all supported by a pedestal 150. The feeding head 111 is preferably formed as one piece from a suitable metal, such as aluminum, and includes an upper top wall 112 and a lower top wall 113, the lower top wall 113 having an infeed hopper 114 therein communicating with a coin slot 115 (see FIG. 3). The top 110 has a lowermost portion 116 which is essentially rectangular in cross section and sits upon the pedestal 150 and is securely fastened thereto. An upper portion 117 of smaller cross section extends upwardly from the lower portion 116, and a coin viewer portion 118 is provided to the right as viewed in FIG. 2. To the left of the coin viewer portion 118 is a fare class panel 119 that is readily accessible to the driver of the bus 50.

As a customer approaches the fare box 105, he is positioned to the right thereof as viewed in FIGS. 2 and 3 and has immediate access to the coin hopper 114 to deposit coins 70 (see FIGS. 14 and 15) therein. The coins 70 fall through the slot 115 and into an upper coin chute 129 (see FIG. 4) and then fall in the direction of the arrows 109 onto a dump door 120. The dump door 120 is mounted on a support 121 by means of a hinge 122 and is normally in the position illustrated in FIG. 4 when receiving coins thereon. The door 120 is movable to a position disposed clockwise and in the direction of the arrow 137 to dump the coins thereon into a lower discharge chute 124. The dump door 120 is visible to the driver of the bus 50 through a glass panel 125 which is illuminated by a light 126 receiving electrical energy through wires 127, a light shield 128 being provided so as not to have a glare from the light 126.

After checking the correctness of the fare on the dump door 120, the bus operator through fare classification keys (to be described more fully hereinafter) energizes a solenoid 130 that moves the dump door 120 in the direction of the arrow 137. The solenoid 130 is mounted on a solenoid base 131 secured to the support 121 and has an armature 132 extending upwardly therefrom and pivotally connected as at 133 to the dump door 120. Two adjusting nuts 134 are provided to trap a spring 135 between the nuts 134 and a retainer 136, the spring 135 urging the dump door 120 to the closed position thereof.

The bus operator records in the data collection unit of the fare box 105 (to be described more fully hereinafter) the class of fare by means of a plurality of switches 145 through 149 so as to classify fares as "full", "student", "senior citizen", etc. Actuation of one of the switches 145 through 149 serves to actuate the solenoid 130. Should the driver within the determined period of time of 6.8 seconds fail to actuate one of the switches 145 to 149, circuitry to be described more fully hereinafter will actuate the solenoid 130 to operate the dump door 120. If the amount of coins placed on the dump door 120 has a weight such as to overcome the compression spring 135, then the weight of those coins will also cause the dump door to move to the dumping position.

If the passenger instead of offering coins as the fare offers paper, that paper is moved in the direction of the arrow 106 in FIG. 3 into a paper slot 140 in the cover 111. The paper may be in the form of currency or in the form of a transfer or in the form of a ticket. The paper is counted and measured by a mechanism to be described more fully hereinafter and thereafter falls past a transparent cover 141 visible to the driver onto a dump door such as the dump door 120 described above. Entry of the fare classification by actuation of one of the switches 145 to 149, or the expiration of the 6.8 second time period without actuation, causes energization of a solenoid 142 (see FIG. 28) to open the dump door to drop the paper into a paper chamber.

The pedestal 150 is essentially rectangular in cross section and includes four outer side walls 151. The top 110 is secured to the pedestal 150 by fasteners that are accessible only through an access door 155 in the top 110 (see FIG. 11). The access door 155 is secured to the lower portion 116 by a piano hinge 156. The lower portion 116 has frame members 157 therein supporting a security locking device 160 that is secured to a member 159 securely fastened to the pedestal 150. More specifically, the security locking device 160 includes a security bar 161 which is secured by non-removable fasteners, such as the rivets 162 to the frame members 157. A strap or lock holder 163 is provided on the security bar 161 and is spaced therefrom by spacers 169 and secured thereto as by welding. Mounted on the strap 163 is a 14 tumbler security lock 166 that is key operated and carries a security plate or cam 165 that pivots with the movable portion of the security lock 166. A screw holder plate 168 is disposed on the side of the security bar 161 opposite the lock 166 and holds in position two screws 158 which serve to secure the lower portion 116 of the top 110 to the pedestal 150, the heads of the screws 158 being accessible for insertion or removal through aligned openings 164 in the strap 163. When the screws 158 are in the attaching positions, and it is desired to prevent access thereto so as to prevent removal, the key operated lock 166 is operated to turn the security plate 165 in the direction of the arrow in FIG. 11A so as to cover the openings 164 with the security plate 165 and thus prevent access to the heads of the screws 158. In order to be able to sense in the central processing unit 500 whether the security plate 165 is in the secure position thereof, an L-shaped extension 167 is mounted on the security plate 165 and carries a solenoid 171 having its armature attached to a flag 170. The flag 170 is formed of metal and in the security position of the security plate 165 it is in operative association with a Hall effect vane switch 175 mounted on the security bar 161 and having a pair of vanes 176 between which the flag 170 is inserted. The solenoid 171 can be used to retract and thereafter reinsert the flag 170 between the vanes 176 so as to test whether in fact the security locking device 160 is operative and unharmed.

A like security locking device 160B is mounted to secure the access door 155 in the closed position thereof, the security locking device 160B also being provided with a security lock 166B, the remaining details of the construction and operation of this second security locking device 160B being the same as those of the first security locking device 160 described herein above.

The construction and operation of the paper chamber and coin chamber in the pedestal 150 will now be described with particular reference to FIGS. 13, 14 and 15 of the drawings. More specifically, there has been provided within the pedestal 150 a chamber assembly 180 that includes a generally rectangular front wall 181 having a rectangular opening 182 in the upper portion thereof for receiving and mounting a portion of the power supply, a large circular opening 183 toward the bottom thereof having two diametrically opposed cutouts 184, a smaller circular opening 185 essentially centrally thereof and another smaller opening 188. Extending outwardly from the front wall 181 is an angle plate 194 that covers the security coupling and mounts portions of the electrical equipment.

Spaced from but in alignment with the front wall 181 is a rear wall 187 also rectangular in shape. The front wall 181 and the rear wall 187 are joined by two side walls 190 and 191, the side wall 191 having two reinforcing angle pieces 192 spaced apart and oriented vertically thereon. A portion of the space between the upper ends of the side walls 190 and 191 is closed by a top wall 193, and there further is provided a cover 195 that is generally rectangular in shape and closes the upper portion of the chamber assembly 180 and has therein a coin-receiving opening 196 and a paper-receiving cutout 197 and carrying a cross bar 198.

Figure 14:
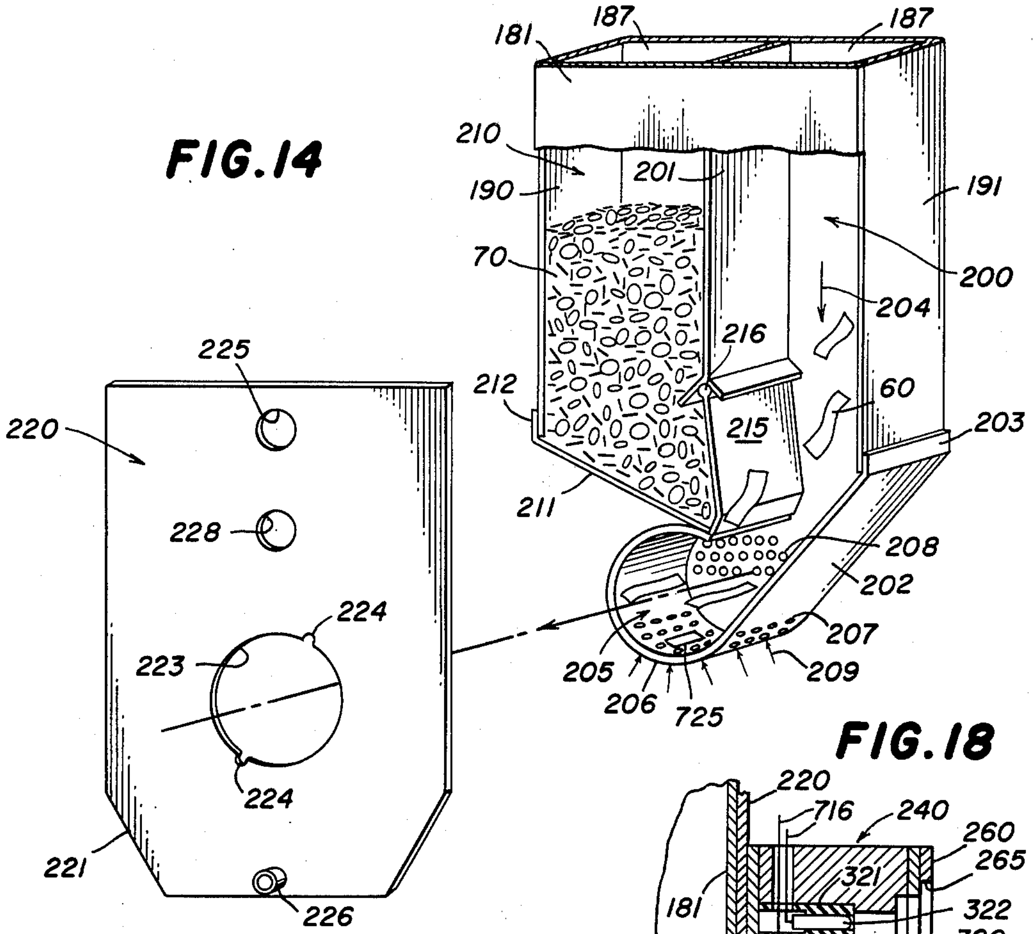
FIG. 14 is a perspective and diagrammatic view with the cover removed showing the coin and paper chambers of the fare box of FIG. 2.
Figure 15:
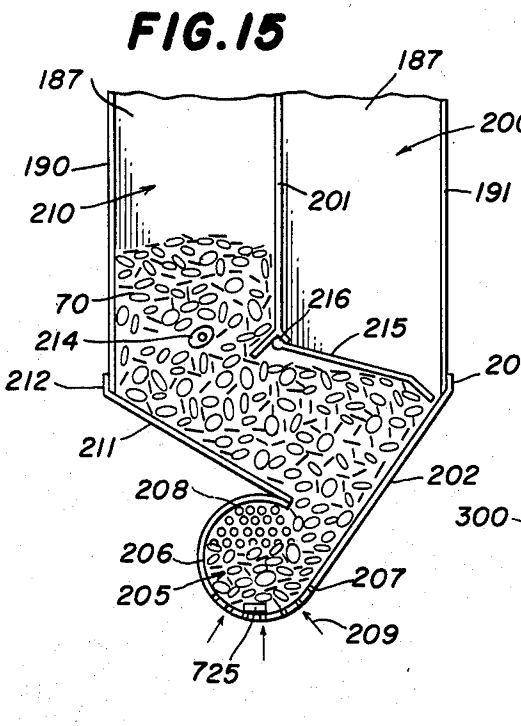
FIG. 15 is a diagrammatic view similar to FIG. 14 and illustrating the condition of the parts when the gate separating the coin chamber from the discharge chamber is in the position permitting a flow of coins into the discharge chamber.

As is best seen in FIGS. 14 and 15, the chamber assembly 180 provides a paper chamber 200 formed by the front wall 181, the rear wall 187, the side wall 191 and an intermediate wall 201. The lower portion of the paper chamber 200 is partially bounded by a bottom inclined baffle 202 having a flange 203 for securement to the side wall 191 and continuing downwardly to provide a discharge chamber 205 bounded by a curved wall portion 206. The curved wall portion 206 has openings 207 therein for admitting air therethrough, and a lower portion of the rear wall 187 also has openings 208 therein so that air can be drawn in the direction of the arrows 209 into the discharge chamber 205.

Disposed beside the paper chamber 200 is a coin chamber 210 defined by the front wall 181, the rear wall 187, the side wall 190 and the intermediate wall 201. An inclined bottom baffle 211 is provided having an attachment flange 212 secured to the side wall 190 and having the other end secured to the curved wall 206. A shiftable gate 215 is hingedly connected as at 216 on the bottom edge of the intermediate wall 201 so as to prevent access of coins 70 in the coin chamber 210 to the discharge chamber 205 so long as the gate 215 is closed, movement of the gate 215 being controlled by a solenoid lock 315, see FIG. 20 also. A chamber mounting plate 220 covers the front wall 181 and has the lower corners cut-off as at 221 and has a circular opening 223 shaped like the circular opening 183 and provided with cutouts 224 that are in alignment with the cutouts 184, and also is provided with openings 225 and 228 in alignment with the openings 185 and 188, respectively. The lower end of the chamber mounting plate 220 extends downwardly below the front wall 181 and carries a hollow projection 226 extending outwardly therefrom.

Figure 13:
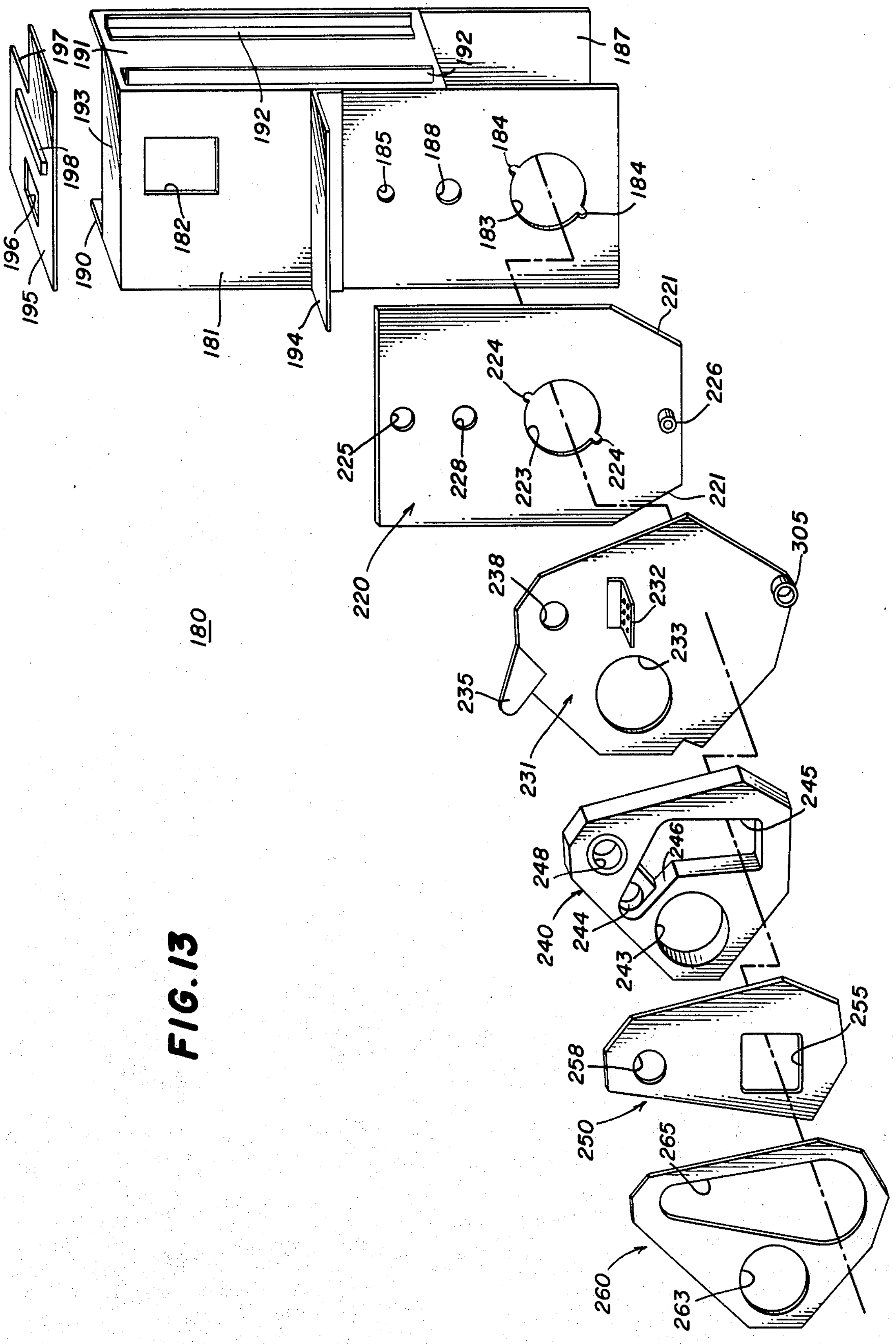
FIG. 13 is an exploded view of the components of the coin chamber, the paper chamber and the acceptor coupling forming a part of the fare box of FIG. 2.

Access to the discharge chamber 205 is provided through the acceptor coupling 230 pivotally mounted on the mounting plate 220 and including a rear coupling plate 231, a coupling body 240, an inner coupling plate 250 and a front coupling plate 260 (see FIG. 13 particularly). The rear coupling plate 231 is provided with a forwardly extending flange 232 having air openings therein and an opening 233 that is circular in shape and is adapted to be brought into alignment with the openings 183 and 223 when the acceptor coupling 230 is in the coupling position thereof. The plate 231 further has an opening 238 therein as well as a cam arm 235 thereon extending outwardly therefrom, and a hollow metal ring 305 extending forwardly therefrom.

The coupling body 240 is of substantial thickness and is provided with a circular opening 243 that is in alignment with the opening 233 in the rear coupling plate 231. A rectangular opening 245 is provided in the body 240 and has a cut away portion 246 extending upwardly and to the left as seen in FIG. 13 and having an opening 244 therein. At the top of the body 240 is an opening 248 for alignment with the opening 238 in the rear coupling plate 231.

The inner coupling plate 250 has a rectangular opening 255 therein for alignment with the rectangular opening 245 in the body 240 and a circular opening 258 for alignment with the opening 248 in the coupling body 240. The front coupling plate 260 has an opening 263 therein circular in shape for alignment with the opening 243 in the coupling body 240 and a tear-drop shaped opening 265 that is shaped and arranged so as to cover the openings 255, 258 in the inner plate 250.

Figure 18:
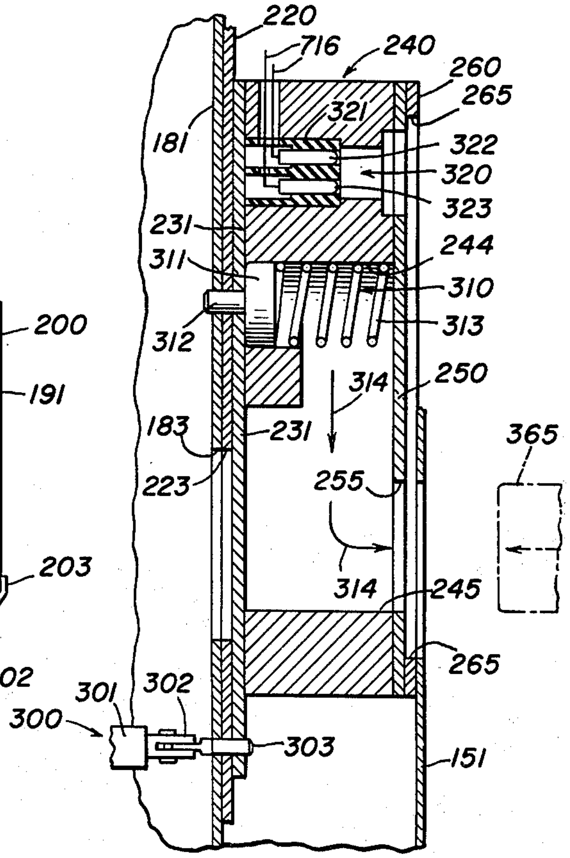
FIG. 18 is a view in vertical section along the line 18—18 of FIG. 16.
Figure 17:
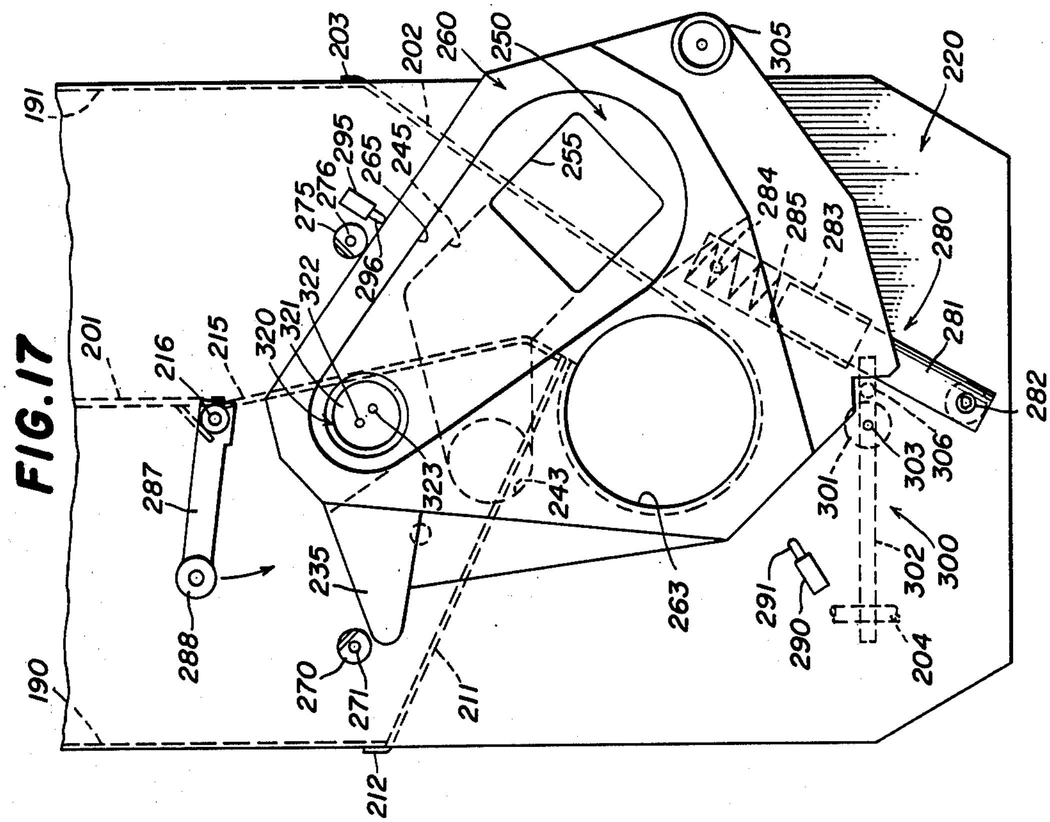
FIG. 17 is a view similar to FIG. 16 in showing the parts in the open or discharging positions thereof.
Figure 16:
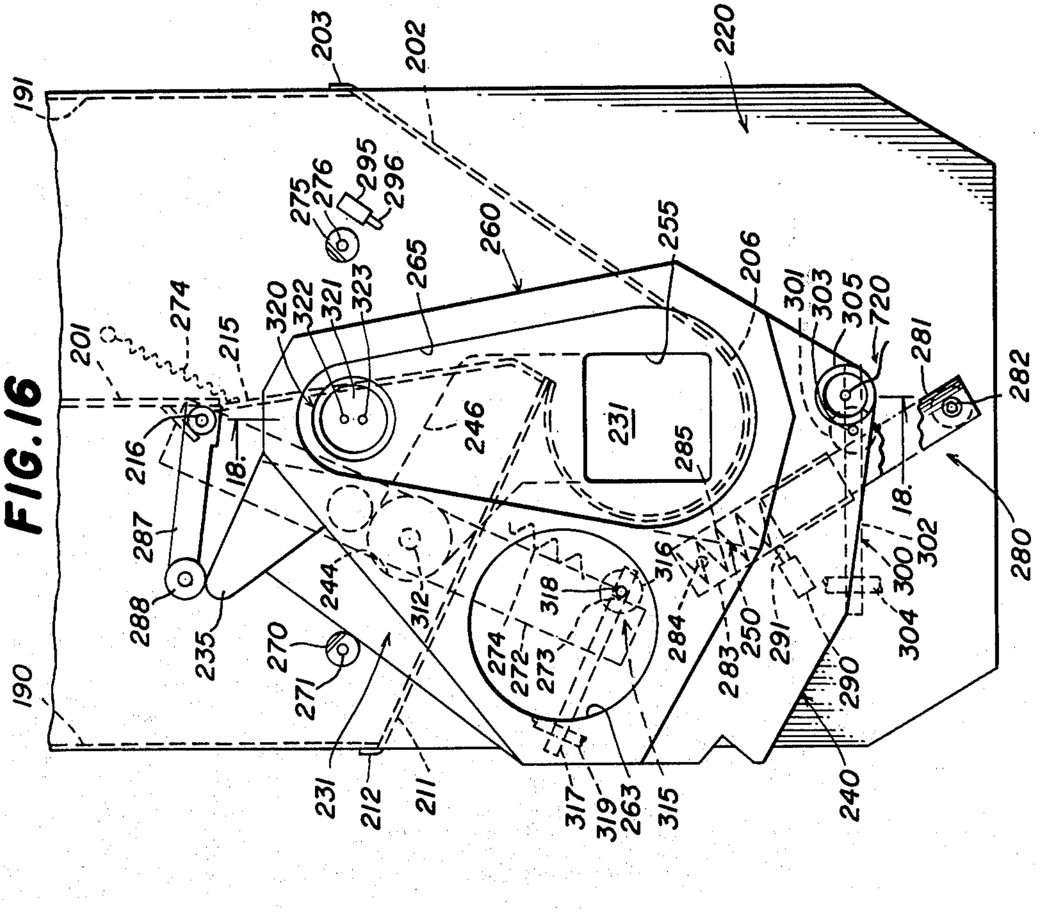
FIG. 16 is a front elevational view of the acceptor coupling on the fare box, the parts being shown in the locking positions thereof.

The various parts of the acceptor coupling 230 are assembled as best seen in FIGS. 16, 17 and 18. When the parts are in the position of FIG. 16, the rear plate 231 has the circular opening 233 therein out of alignment with the circular opening 223 in the mounting plate 220, thus to block access to the discharge chamber 205. When the parts are moved to the position illustrated in FIG. 17, the openings 233 and 243 and 263 are moved into alignment with the openings 183 and 223 so as to provide access to the discharge chamber 205 in the pedestal 150.

The acceptor coupling 230 is held in the locking position of FIG. 16 by a over-center mechanism 280 holding the parts against a stop 270 secured to the chamber mounting plate 220 by a fastener 271. Likewise when the acceptor coupling 230 is in the extraction or discharge position of FIG. 17, it is held in that position by the over-center mechanism 280 and against a stop 275 held in position by a fastener 276 on the chamber mounting plate 220. The over-center mechanism 280 includes an inner cylinder 281 pivotally mounted as at 282 on the chamber mounting plate 220, and an outer cylinder 283 receiving the adjacent end of the inner cylinder 281 therein and pivotally connected as at 284 to the acceptor coupling 230. Disposed within the cylinders 281 and 283 and held in compression thereby is a spring 285 that continually urges the cylinders 281 and 283 to the extended positions thereof.

Also mounted on the chamber mounting plate 220 is a lever arm 287 and a cam follower 288 that are secured to the gate 215, the cam follower 288 being in position to be engaged by the cam arm 235 on the rear plate 231 when the acceptor coupling 230 is in the closed position illustrated in FIG. 16, thereby to return and hold the gate 215 in the closed position thereof. Also connected to the gate 215 and pivoted about the hinge 216 is another lever arm 272. Connected between the lever arm 272 and the chamber mounting plate 220 is a spring 274 under tension which is positioned to urge the paper gate 215 toward the open position thereof. Preventing such movement of the lever arm 272 is a paper gate lock 315 that is actuated by a solenoid 316 acting upon an arm 317 pivoted as at 319. The arm 317 carries a latch 318 that engages in a notch 273 in the lever arm 272 to hold it in the closed position for the paper gate 215. Withdrawal of the latch 318 by actuation of the solenoid 316 releases the lever arm 272 so that the spring 274 can pivot it to the right or in a counterclockwise direction as viewed in FIG. 6 so as to move the gate 215 to the open position thereof discharging coins from the coin chamber 210 into the discharge chamber 205.

In order to be able to sense the position of the acceptor coupling 230, two position switches have been provided, namely, switches 290 and 295, both mounted on the chamber mounting plate 220. The switch 290 has an actuator 291 engaging the outer cylinder 283 and is held normally closed by the parts when in the position of FIG. 16. Movement of the acceptor coupling 230 through an arc of 5° serves to open the switch 290. The switch 295 is normally open and has an actuator 296 which is engaged by the aceptor coupling 230 to close the switch 295 when the acceptor coupling 230 is in the fully open position illustrated in FIG. 17.

Referring particularly to FIGS. 17 and 18, a first security lock 300 is provided to hold the acceptor coupling 230 in the closed position of FIG. 16 until the proper security protocol has been satisfied and emptying of the contents of the pedestal authorized. The security lock 300 includes a solenoid 301 attached to a plate 302 pivoted to the plate 220 at one end and carrying at the other end a latch 303 that enters into an opening in the rear coupling plate 321, the plate 302 being spring urged to place the latch 303 in the latching position illustrated in FIG. 18. The plate 302 can be moved away from the locking position to withdraw the latch 303 by the solenoid 301. The position of the latch 303 is detected by a switch including the metal ring 305 and a contact 306 on the plate 302 that contacts the ring 305 when the latch 303 is in the locking position thereof.

A vacuum security lock 310 also is provided in the coupling body 240 (see FIG. 18 particularly). More specifically, the opening 244 has mounted therein a piston 311 carrying a latch 312 engageable in an opening in the chamber mounting plate 220. A compression spring 313 acts between the piston 311 and the inner plate 250 to hold the latch 312 in the latching position. Application of a vacuum in the direction of the arrows 314 serves to pull the piston 311 to the right as viewed in FIG. 18 and thus to withdraw the latch 312 and to open the vacuum lock 310.

The data transmission connection 320 is disposed in the coupling body 240 and is best illustrated in FIG. 18 of the drawings. There is provided a generally cylindrical insulating mount 321 in which are mounted two parallel spaced-apart light emitting diodes 322 and 323 that are supplied by electrical energy through conductors 716. The data transmission connection 320 cooperates with the data connector 380 forming a part of the extractor coupling 330.

Figure 19:
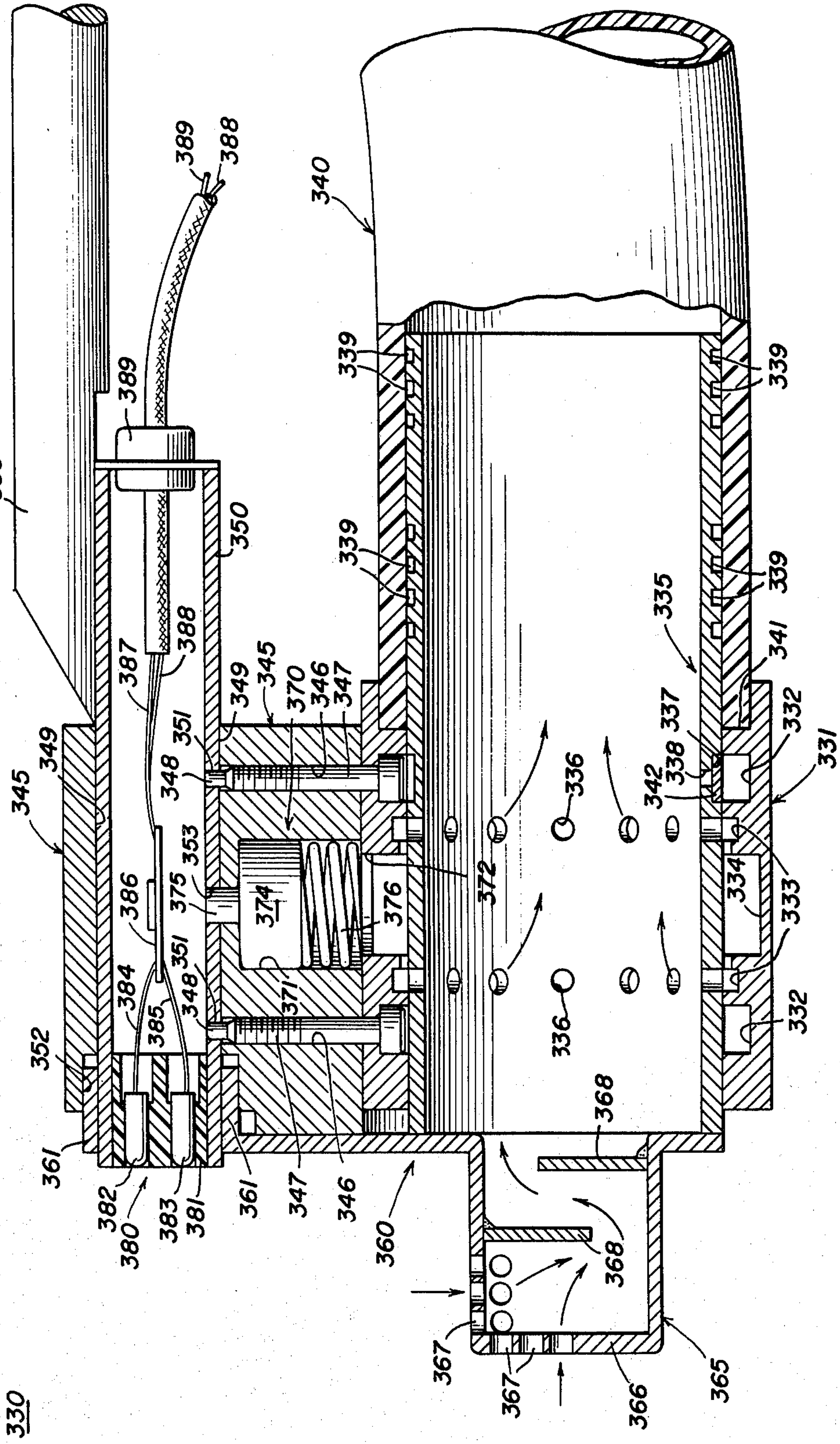
FIG. 19 is a view in section through the extractor coupling forming a part of the fare collection system of the present invention.

Referring to FIG. 19, the details of construction an operation of the extractor coupling 330 will be described in detail. There is provided a generally cylindrical body 330 having a central opening therethrough, and extending outwardly from the central opening are two spaced-apart annular grooves 332 with adjacent associated shallower grooves 333 that are disposed on either side of an annular channel 334. The annular opening in the body 331 receives a generally cylindrical tube 335 which is held in position therein by a flat spring 342 disposed in the righthand most groove 332. More specifically, an outer groove 337 is provided on the exterior of the tube 335 which receives a portion of the retainer spring 342 therein, an opening 338 being provided for insertion of a tool to depress the spring 338 thus permitting removal of the tube 335, the tube 335 therefore being removably and detachably associated with respect to the body 331 and free to rotate with respect thereto while being retained therein. The tube 335 has two annular rows of holes 336 in alignment with the grooves 334 in the body 331 to provide an air passage from the channel 334 via the grooves 333 and the holes 336 to the interior of the tube 335. The tube 335 also has two sets of grooves 339 on the outer surface thereof that serve to aid in holding the adjacent end of the hose 340 connected therewith, the hose having its outer end extending into a recess 341 formed in the inner surface of the body 331.

Fixedly mounted on the body 330 is a block 345 having holes 348 that align with holes in the grooves 332 extending through the outer wall of the body 331 for receiving bolts 347 therethrough. The block 345 further has a cylindrical bore 349 extending therethrough with the axis thereof parallel to the axis of the tube 335. The bore 349 receives an annular tube 350 that has two spaced-apart circumferentially extending slots 351 therein, the circumferential extent of the slots 351 being 45°. The bolts 347 have tips 348 that extend into the slots 351, thus removably to secure the tube 350 to the block 345 and permitting a 45° rotation of the tube 350 with respect to the block 345. There also is formed in the wall of the tube 350 a lock cooperating opening 253 to be described more fully hereinafter. The righthand end of the tube 350 carries a handle 355 provided at the outer end with a handgrip 356.

Mounted on the tube 350 and fixedly secured thereto is a security plate 360 which is shaped and arranged in the locking position thereof illustrated in FIG. 19 to close the lefthand end of the tube 335 and prevent access to the interior thereof. The upper portion of the security plate 360 has an opening therein surrounded by an annular flange 361 that is disposed in a recess 352 in the block 345. The annular flange 361 is fixedly secured to the tube 350 for rotation therewith and control thereby. The portion of the security plate 360 opposite the opening to the tube 335 is provided with a nose 365 that is square in shape and has a size and shape to fit into the square openings 255 and 245 in the acceptor coupling 230. The lefthand end of the nose 365 is closed by an end wall 366 and the upper portion of the nose 365 and the end wall 366 are provided with openings 367 providing an air path around baffles 368 to the interior of the tube 335 and thence to the hose 340. When the nose 365 is inserted in the openings 255 and 245, the passage 246 to the vacuum lock 310 is connected through the openings 367 to the interior of the tube 335.

A vacuum lock 370 is provided to hold the tube 350 and thus the security plate 360 in the blocking position until application of the appropriate vacuum via the hose 340 to the extractor coupling 330. The vacuum lock 370 includes a recess 371 in the block 345 within which is disposed a cylinder 374 having a pin 375 extending upwardly therefrom and into the opening 353 in the tube 350. A spring holds the cylinder 374 with the pin 375 in the locking position. An opening 372 is the body 331 communicates with the channel 334 so that when vacuum is applied to the interior of the body 331, it is communicated to the underside of the cylinder 374 thus moving the cylinder 374 down against the action of the spring 376 to withdraw the pin 375 from the opening 353, thus to release the tube 350 and the attached security plate 360 for shifting from the closed position to the open position thereof. If the nose 356 is inserted in the openings 245 and 255 of the acceptor coupling 230 when the vacuum lock 370 is released, then the nose 365 can also move the acceptor coupling 230 from the closed position illustrated in FIG. 16 to the open positon illustrated in FIG. 17 if the locks 300 and 310 are released, thus to establish communication from the discharge chamber 205 through the acceptor coupling 230 and the extractor coupling 330 to the hose 340 and thus to the central processing unit 500.

The data connection 380 is disposed in the tube 350 and includes an insulating body 381 disposed in the lefthand end of the tube 350. Disposed in the insulating body 381 are two parallel arranged light emitting diodes 382 and 383 that are arranged so as to be disposed opposite the light emitting diodes 322 and 323, respectively, in the data transmission connection 320. The diodes 382 and 383 are connected by conductors 384 and 385 to a printed circuit board 386 carrying the driving circuitry for the diodes 382 and 383, and which is in turn connected to conductors 387 and 388 extending through a grommet 389 to the exterior of the tube 350.

In using the extractor coupling 330 to extract paper and coins from the chambers 200 and 210 through the acceptor coupling 230, a typical cycle of operation begins with the extractor coupling 330 parked in the post 670 (see FIG. 1) and locked therein by the lock 680. The post 670 is located near a lane through which buses 50 pass for extraction of the fares and data therefrom, and may be located several hundred feet from the central processing unit 500. The operator uses a key in the lock 680 to remove the extractor coupling 330 after which he boards a bus 50 and inserts the square nose 365 on the extractor coupling 330 (see FIGS. 18 and 19) into the aligned square openings 245 and 255. The vacuum pump 580 is started. Insertion of the nose 365 into the coupling body 340 will therefore actuate the vacuum lock 310 to withdraw the latch 312. The vacuum lock 370 is also actuated to withdraw the latch 375 and thus to free the handle 355 for rotation with respect to the nose 365. The data connector 380 is placed in the opening 265 and adjacent to the data transmission connection 320 with the pairs of light emitting diodes in general alignment. Assuming that the necessary electronic protocol is satisfied, the security lock 300 has the solenoid 301 thereof energized to withdraw the latch 303 and thus free the coupling body 240 and acceptor coupling 231 for rotation with the security plate 360 in a counterclockwise direction as viewed in FIG. 16. The operator using the handle 355 moves the parts then from the positions of FIG. 16 to the positions of FIG. 17, thus creating a connection between the hose 340 and the discharge chamber 205.

Disposed in the upper portion 117 of the fare box top 110 and below the upper top wall 112 of the feeding head 111 is a paper counter-measurer, generally designated by the numeral 400, that serves to distinguish between paper currency and paper transfers and paper tickets and to count the same individually. The construction and operation of the paper counter-measurer 400 is best illustrated in FIGS. 5 to 10 of the drawings, wherein it will be seen that there are provided two frame plates 401 that are spaced apart and are held in the spaced-apart position by a motor base plate 402 (see FIG. 9) secured to the frame plate 401 by suitable bolt and nut fasteners 403. When a piece of paper is inserted into the paper slot 140 in the direction of the arrow 106 in FIG. 3, it immediately passes onto a guide 405 (see FIG. 5) secured by a bracket 406 to one of the frame plates 401. Disposed over the guide 405 is a second guide 407 that extends to the left and then downwardly in FIG. 5, all as illustrated. From the guide 405, paper 60 is fed onto a carrier generally designated by the numeral 410 that includes two drive rollers 411 mounted on a shaft 415 (see FIG. 6 also). Each of the rollers 411 has a cover 412 of friction material and is provided with a hub 413 receiving a pin 414 securely to fasten the associated roller 411 to the shaft 415. The shaft 415 is journalled in the frame plates 401 by means of bearings 416 that are preferably formed of nylon or other self-lubricating material.

Drive for the rollers 411 is derived from a motor 420 (see FIG. 9 also) that is mounted on the motor base plate 402 by means of screws 421. The motor 420 has an output shaft 422 to which is secured a shaft extension 423 by means of a pin 424. The shaft extension 423 carries a radially outwardly extending counting pin 425 used to count the number of revolutions of the shaft extension 423 for a purpose that will be described more fully hereinafter. Secured to the shaft extension 423 is a drive gear 426 of the worm-type secured thereto by a bolt 427. The drive gear 426 engages a gear 428 that is fixedly secured to a shaft 415 by a set screw 429.

Disposed above and cooperating with the drive rollers 411 are two idler rollers 430 mounted on a shaft 431 disposed in generally vertically extending slots 408 in the frame plates 401. The idler rollers 430 are secured on the shaft 431 by retaining rings 432 and are pressed toward the associated drive rollers 411 by an idler spring 433. The spring 433 is pressed and held in position by a tie bar 435 (see FIG. 7 also) extending between the frame plates 401 and secured thereto by screws 436. An annular groove 437 is provided centrally of the tie bar 435 in which the spring 433 is disposed.

Figure 5:
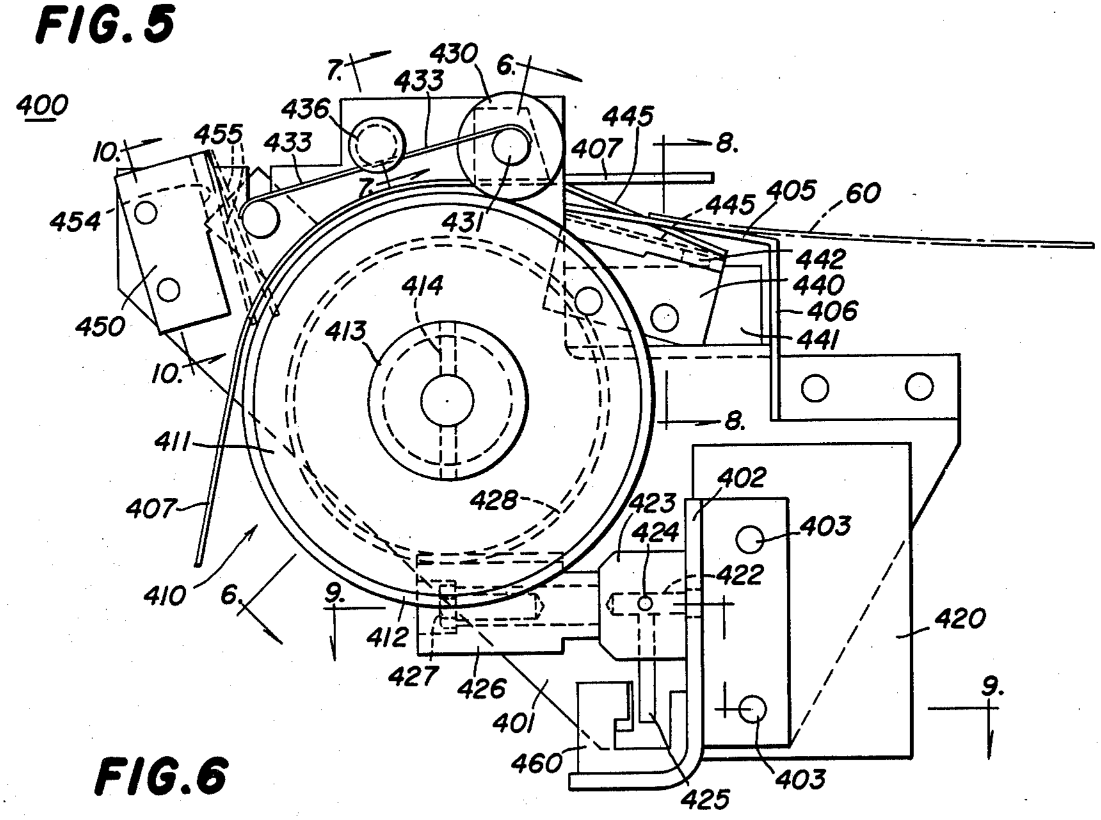
FIG. 5 is a side elevational view with certain parts broken away of a paper counter-measurer forming a part of the fare box of the present invention.
Figure 6:
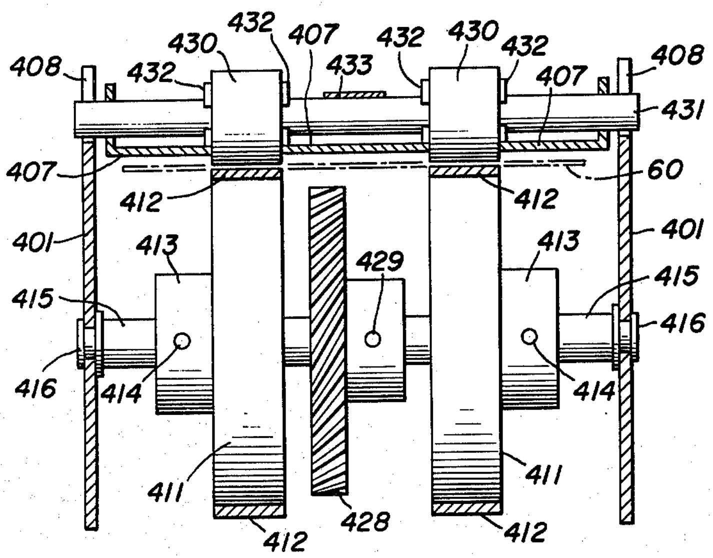
FIG. 6 is a view in section along the line 6—6 of FIG. 5.
Figure 7:
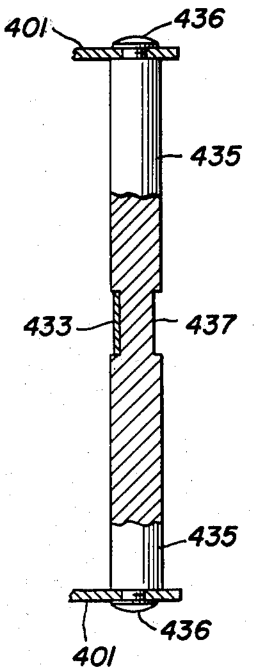
FIG. 7 is a view in section along the line 7—7 of FIG. 5.
Figure 8:
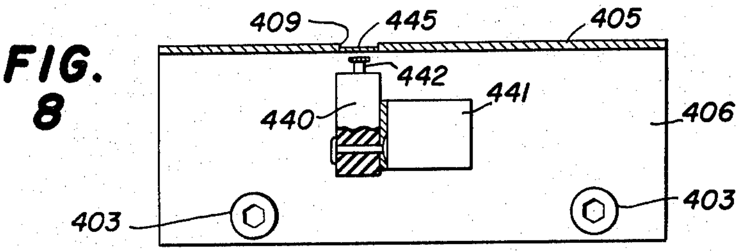
FIG. 8 is a view in section along the line 8—8 of FIG. 5.

Electrical control for the drive motor 420 is through a control switch 440 (see FIG. 5 and 8). The switch 440 is disposed below the guide 405 and is held in that position by a bracket 441. The switch 440 has the usual plunger 442 as well as a pivoted arm 445 for actuating the plunger 442. The switch arm 445 extends upwardly through a slot 409 in the guide 405 and into the path of a piece of paper 60 passing between the guides 405 and 407, the switch arm 445 extending upwardly to the guide 407 as is best illustrated in FIG. 5. Engagement of the switch arm 445 by a piece of paper 60 serves to close the switch 440 and energize the motor 420. The carrier 410, and specifically the drive rollers 411 thereof, thereafter begin to rotate and thus drive the paper 60 between the rollers 411 and the idler rollers 430 along a path disposed between the drive rollers 411 and the guide 407.

In order to measure and count the pieces of paper 60 passing through the device 400, there has been provided a plurality of sensing switches 450 (see FIG. 10 also), the switches 450 being six in number and arranged in a longitudinal array transversely to the path of travel of a piece of paper 60 being fed by the drive rollers 411 under the guide 407. The switches 450 are mounted on two rods 451 that extend between the frame plates 401 and are secured by cooperating washers 452 and nuts 453 on opposite sides of the frame plates 401. Each of the switches 450 is provided with the usual plunger 454 and actuating switch arm 455 (see FIG. 5). The desired positioning of the switches 450 is provided by spacers 456 that are arranged to position and hold the switches 450 in the desired position across the path of travel of a piece of paper 60. The switch arms 455 extend through appropriate slots (not shown) in the guide 407 and to the position extending to the right as viewed in FIG. 5. Contact of a piece of paper 60 with a switch arm 455 causes the switch arm to be pivoted to the lefthand position of FIG. 5 and thus to depress the plunger 454 on the associated switch 450 and to close the same.

In operation, a piece of paper 60 is fed through the paper slot 140 (FIG. 3) and between the guides 405 and 407 where it first encounters switch arm 455, and upon actuation of the switch arm 445, the motor 420 is energized and the drive rollers 411 begin operation. The counting pin 425 cooperates with a Hall effect vane switch 460 and more specifically is spun thereby, and through circuitry to be described more fully hereinafter, causes the switch 450 to have the output thereof recorded for each one quarter inch of travel of the piece of paper 60. As a result, a record is made of those switches 450 that are actuated during each quarter inch of travel of a piece of paper 60, thus to map the shape of the piece of paper 60, and regardless of whether the piece of paper 60 is fed straight or skewed or in some other manner past the switches 450, just so long as the piece of paper is fed unfolded. In this manner, the mechanism 400 can distinguish amoung paper currency and paper transfers and paper tickets, and can therefore count the same independently one of the other. It will be understood that more or fewer switches 450 may be used and that the switches 450 may be arranged in other arrays than that illustrated.

The details of construction of the central processing unit will now be described with reference first to FIG. 1 of the drawings. FIG. 1 is diagrammatic as regards the central processing unit 500, but there is provided a lower generally rectangular housing 501, provided with access doors (not shown) and an upper housing 502 that has a panel for entry of the hoses 340 and 340A. A control panel 505 is provided on the lower housing 501 and houses the controls for both sets of equipment within the central processing unit 500. Only one set of the equipment disposed within the central processing unit 500 will be described in detail, and where portions of the second set of equipment are illustrated, the same reference numerals will be applied to like parts with the addition of the suffix "A" thereto.

Figures 20, 21:
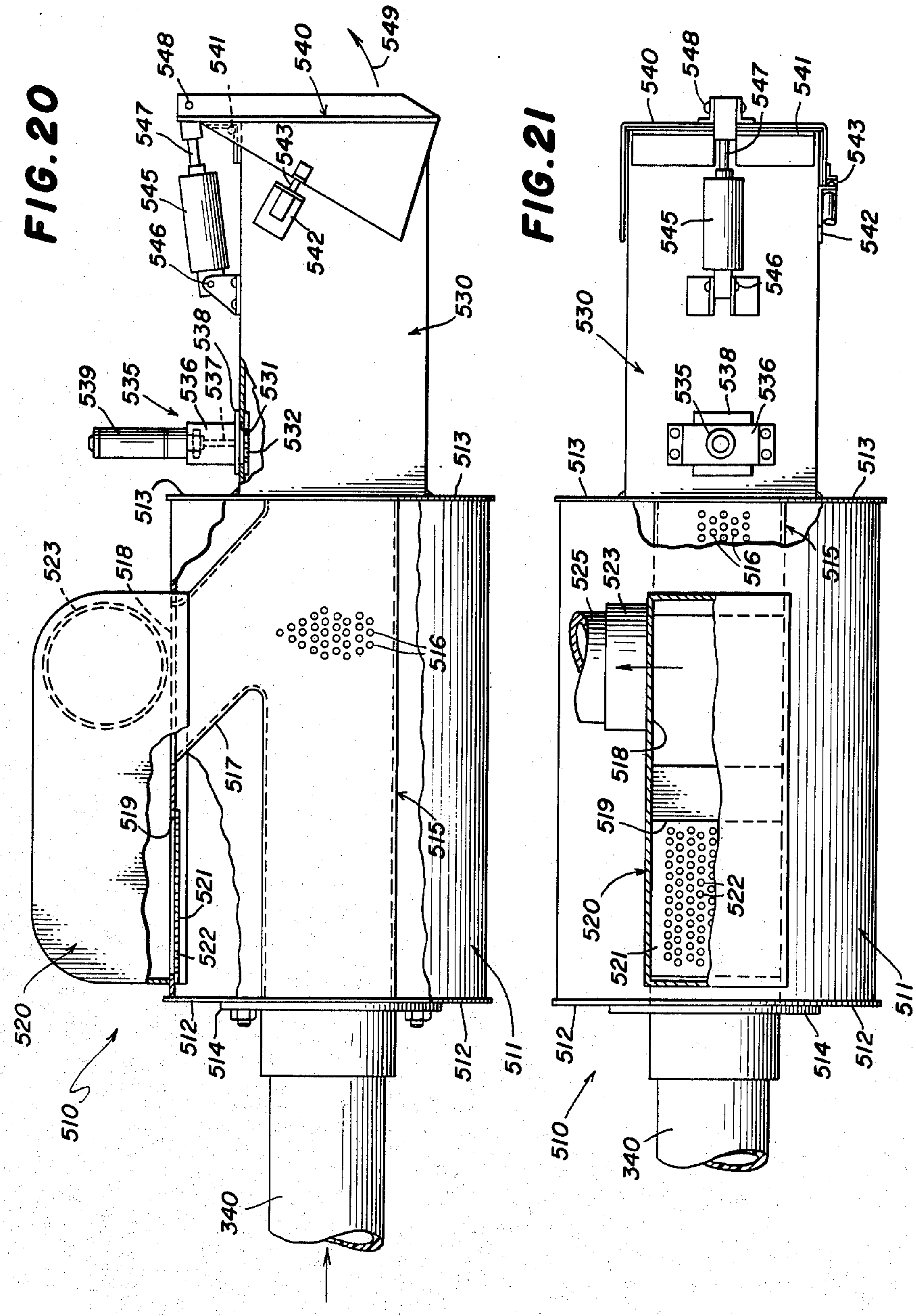
FIG. 20 is a side view with certain parts broken away of the slowdown chamber and coin escrow forming a part of the fare collection system of the present invention.
FIG. 21 is a plan view of the parts illustrated in FIG. 20.

The hose 340 after entering the housing 502 is connected to the slowdown assembly 510 disposed in the upper housing 501. Referring more specifically to FIGS. 20 and 21 of the drawings, it will be seen that the slowdown assembly 510 includes a cylindrical chamber 511 provided with end walls 512 and 513. A coupling 514 is provided on the end wall 511 to connect with the hose 340. Disposed within the chamber 511 is the main duct 515 that has the left end communicating with the hose 340 and the right end exiting into a coin escrow 530. The main duct 515 has a plurality of openings 516 distributed throughout the area thereof, and extending upwardly and rearwardly or to the left from the main duct 515 and adjacent to the end wall 513 is a paper duct 517 also carrying openings 516. The upper end of the paper duct 517 communicates with an opening 518 in the chamber 511, a paper chamber 520 generally square in form being disposed on the chamber 511 and secured thereto and sealed therewith. A second opening 519 is provided in the wall of the chamber 511 and communicating with the interior of the paper chamber 520, a plate 521 with openings 522 therein covering the opening 519 so that air can pass therethrough but paper cannot. One side of the paper chamber 520 has an outlet coupling 523 disposed thereon connecting with the hose 525 (see FIG. 1 also).

The coin escrow 530 has a diameter slightly greater than the inner diameter of the main duct 515 and is fixedly secured to the end wall 513 such as by welding. Formed in the upper portion of the escrow 530 and adjacent to the end wall 513 is an opening 531 covered internally by a screen 532. A bleeder valve 535 is mounted on a bracket 536 straddling the opening 531. The valve 535 is operated by a solenoid 539 and includes a shaft 537 carrying a sealing plate 538 thereon that is moved by the solenoid 539 into and out of covering relationship with the opening 531.

The lower or righthand end of the coin escrow 530 is closed by an escrow door 540 hinged to the escrow 530 by a hinge 541. A motor 545 is mounted on the top of the escrow 530, the lefthand end being secured to a pivot mount 546 and the righthand end having extending therefrom a shaft 547 pivotally mounted as at 548 to an extension of the escrow door 540. The motor 545 can be used to open the escrow door 540 in the direction of the arrow 549 in FIG. 20 and to the position illustrated in FIG. 1, and likewise can be utilized to close the escrow door to the closed position illustrated in FIGS. 20 and 21. A Hall type sensing switch 542 is mounted on the escrow 530 and cooperates with a flag 543 on the door 540 to sense the position of the escrow door 540.

Figure 22:
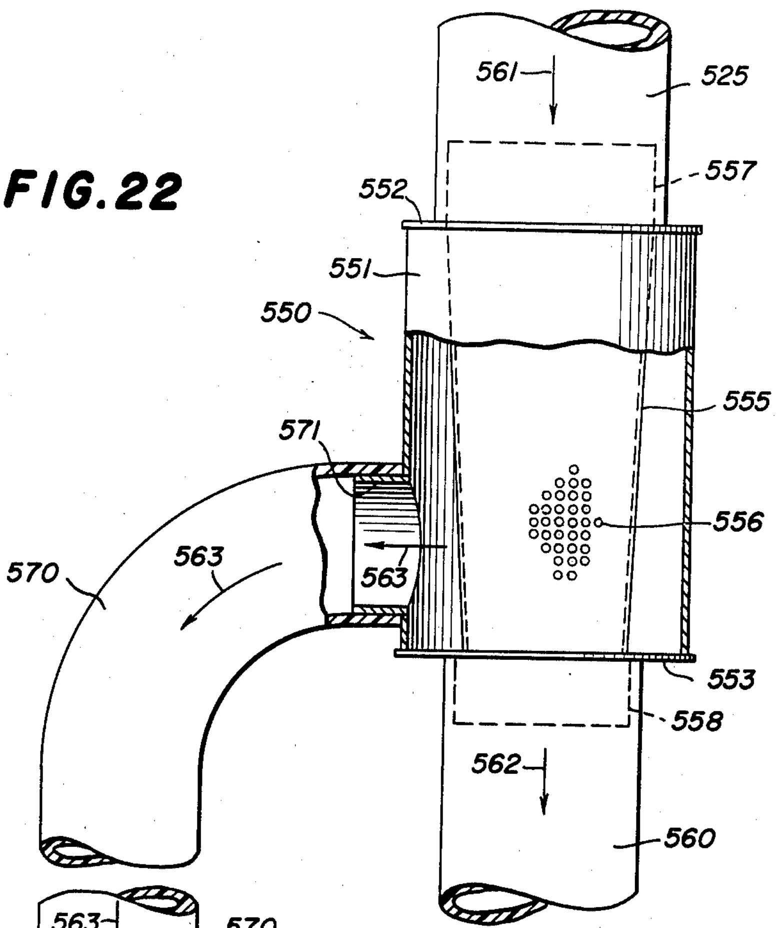
FIG. 22 is a side elevational view with certain portions broken away of the paper slower/separator and pulsing valve forming a part of the present invention.
Figure 22:
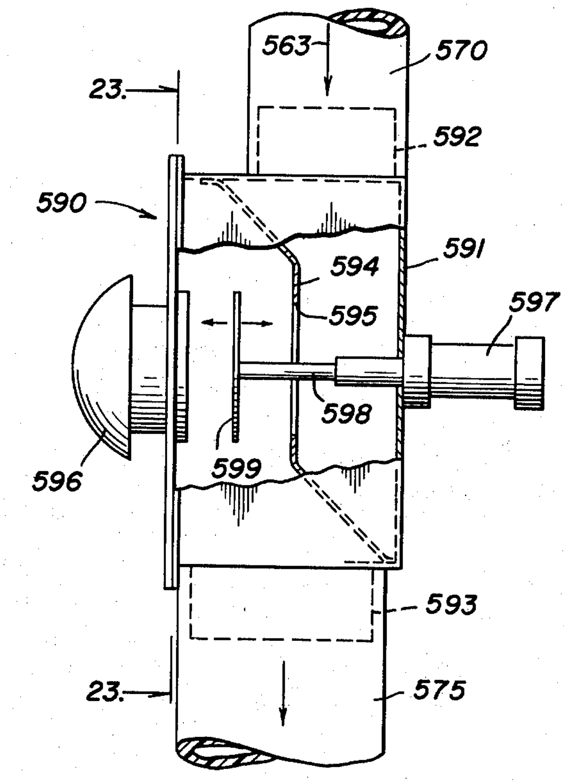

The air and paper stream flowing through the hose 525 from the paper chamber 520 in FIGS. 20 and 21 passes downwardly (see FIG. 1) to the paper slower/separator 550, the details of construction of which are shown in FIG. 22 of the drawings. There is provided a chamber 551 having a top end plate 552 and a bottom end plate 553, and a duct 555 conical in shape and tapering downwardly and extending between the two end plates 552 and 553 and having a plurality of openings 556 therein. The upper end of the duct 555 is connected by a coupling 557 to the adjacent end of the hose 525. The lower end of the duct 555 is connected by a coupling 558 to the hose 560 that serves to drop the paper into the paper vault 565 (see FIG. 1). The air from the paper-air stream flowing through the hose 525 passes outwardly through the openings 556 in the duct 555 and to the hose 570, a coupling 571 mounted on the chamber 551 connecting to the hose 570. As a result of the action of the paper slower/separator 550, the combination paper-air stream in the hose 525 flowing in the direction of the arrow 561 is separated into two streams, the paper falling through the hose 560 in the direction of the arrow 562 and the air passing through the openings 556 in the duct 555 and flowing outwardly through the hose 570 in the direction of the arrows 563.

The other end of the hose 570 is connected to the pulsing valve 590 and the air then flows through the hose 575 to the vacuum pump 580 (see FIG. 1). The vacuum pump 580 is of standard construction and includes an inlet connection 581 to which the hose 575 is connected. A relief valve 582 is provided for the vacuum pump 580, the relief valve 582 being of the spring-loaded plunger type. A vacuum gage 583 is also connected to the vacuum pump as is a vacuum switch 584 that is actuated at a vacuum of about 13 inches of mercury. The vacuum switch 584 controls a solenoid air valve 585 which in turn controls a valve 586 that is solenoid controlled and is placed in a high pressure air line 579 that supplies the air to the air motor for the pulsing valve 590, as will be described more fully hereinafter.

Figure 23:
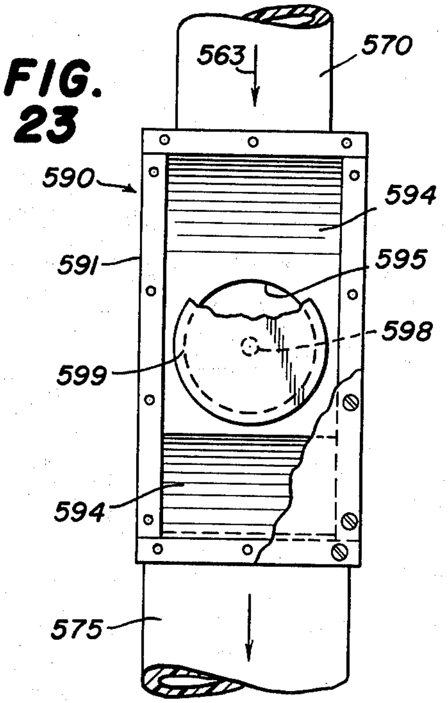
FIG. 23 is a view in vertical section along the line 23—23 in FIG. 22.
Figure 24:
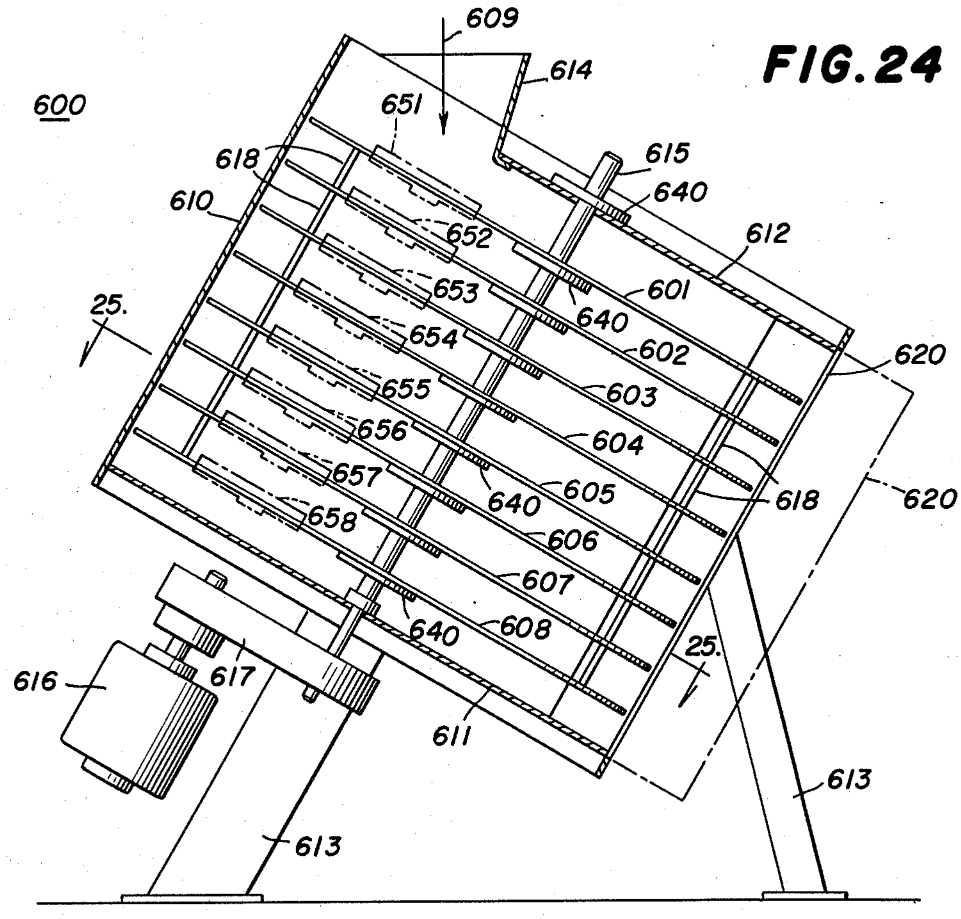
FIG. 24 is a view in vertical section through a coin sorter-counter forming a part of the fare collection system of the present invention.

Referring to FIG. 22 and FIG. 23, the details of construction and operation of the pulsing valve 590 will be given. There is provided a generally rectangular housing 591 having an upper coupling 592 connected to the hose 570 and a lower coupling 593 connecting to the lower hose 575. Disposed in the housing 591 and dividing it into two chambers is a baffle 594 that is imperforate, except for a centrally disposed opening 595 therein. The lefthand chamber as viewed in FIG. 22 is connected to the atmosphere through an air inlet 596. There is mounted on the housing 591 on the right a motor 597 provided with an output shaft 598 that reciprocates and carries on the outer end thereof a valve plate 599 which can be moved by actuation of the motor 597 to the right to close the opening 595, thus removing vacuum from the portion of the system above the hose 570, and which likewise can be moved by the motor 597 to the left to close and block the air inlet 596, whereby the vacuum pump 580 draws air only from the system within the central processing unit 500. The motor 597 is air actuated under the control of the valve 586 in the air line 579 (see FIG. 1) during conveying of paper two to four times per second so as to pulse the air stream flowing through the pulsing valve 590. This serves to prevent the accumulation of paper along the various hoses and conduits and other pieces of equipment encountered. If the vacuum switch senses a vacuum of 13 inches of mercury during the conveying of coins, the valve 590 is pulsed once, which serves to prevent blockage of coins during the transfer thereof from the fare box 105 to the escrow 530.

After the coins from the fare box 105 of a single bus 50 have been deposited in the coin escrow 530, the escrow door 540 is opened. It is pointed out that the longitudinal axis of the slowdown assembly 510 and the coin escrow 530 is disposed at an angle of approximately 30° with respect to the horizontal, whereby the coins in the coin escrow 530 upon opening of the escrow door 540 will fall therefrom under the urging of gravity. The coins from the coin escrow 530 fall into the coin sorter-counter 600, the details of which are best illustrated in FIGS. 24 to 27 of the drawings.

The coin sorter-counter 600 comprises a plurality of sorting plates 601 through 608, so as to be able to sort and count coins of denominations of 50 cents, 25 cents, 5 cents, 1 cent and 10 cents, as well as three different sizes of tokens. As illustrated, the sorting plates 601 through 608 are formed flat and each is essentially covered by a plurality of openings 621 through 628, respectively, the openings in the plate 601 being the largest and the openings in the plate 608 being the smallest with the openings in the plate 601 being large enough to pass all coins except 50 cent pieces, and the openings in the plate 608 being smaller than the smallest coin or token to be sorted and counted. The plates 601 to 608 are disposed within an encircling fixed annular drum 610 having a fixed bottom 611 therein and a fixed top 612 at the upper end thereof on which is mounted a hopper 614 that receives coins in the direction of the arrow 609 from the escrow 530 (see FIG. 1 also). The sorting plates 601 to 608 are all mounted upon a drive shaft 615 mounted in the drum 610 and on the bottom 611 and the top 612 for rotation about an axis inclined at about 60° with respect to the horizontal. The lower end of the shaft 615 carries a pulley (not shown) that is driven by a motor 616 through a drive belt 617. In order to reinforce and stabilize the sorting plates 601 to 608, a plurality of spacers 618 is disposed therebetween circumferentially therearound and spaced inwardly from the outer periphery thereof (see FIG. 25 also). The entire sorter is supported upon a plurality of legs 613 that rest upon an underlying support surface. The drum 610 is provided with a side door 620 disposed to the right in FIG. 24 and connected thereto by a piano-type hinge 630.

Figure 26:
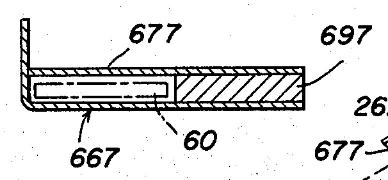
FIG. 26 is an enlarged view in section along the line 26—26 of FIG. 25 through a coin discharge track.
Figure 25:
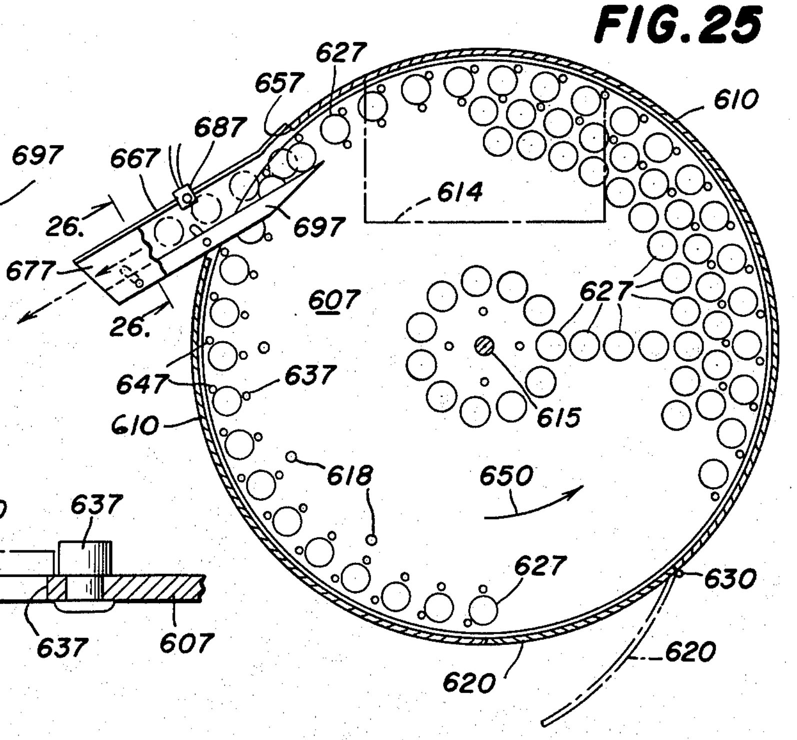
FIG. 25 is a view in cross section along the line 25—25 through the coin sorter-counter illustrated in FIG. 24.
Figure 27:
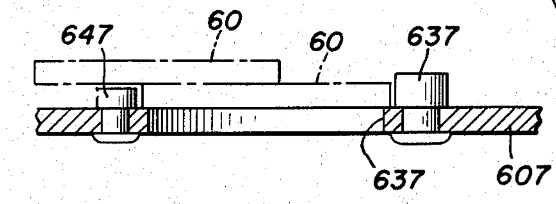
FIG. 27 is an enlarged fragmentary view in vertical section through a pair of cooperating projections mounted on the coin sorter plate of FIG. 25.

In the operation of the sorter-counter 600, coins deposited through the hooper 614 all fall upon the sorting plate 601 which is designed to retain 50 cent pieces. All of the other coins fall through the plate 601 and eventually distribute themselves upon the underlying plates, the plates being rotated continually about and upon the shaft 615 while the coins are falling through the hopper 614 and the sorting plates. Sorting plate 607 is designed to retain 10 cent pieces thereon, any smaller pieces falling through the plate 607 and onto the sorting plate 608, and any pieces smaller than the openings in plate 608 falling onto the bottom 611. For purposes of illustration, there is shown in FIGS. 25 through 27 the construction and operation of sorting plate 607 which is designed to retain 10 cent pieces or dimes thereon. Although sorting plate 607 has been shown by way of illustration, it will be understood that the other sorting plates 601 through 608 are constructed and arranged in a like manner, the only difference being the size of the openings 621 through 628 formed therein. The outermost row of the opening 627 in FIG. 25 is spaced inwardly a short distance from the outer periphery of the sorting plate 607. Concentric rows of additional openings 627 are formed extending radially inwardly as seen to the right in FIG. 25. Disposed adjacent to only the openings 627 in the outermost row of openings 627 are cooperating pairs of projections 637 and 647. The projections 637 are disposed radially inwardly with respect to the associated opening 627 and, as is illustrated in FIG. 27, have a height slightly greater than that of the associated coin 60 to be retained on the sorting plate 627, that being a dime as illustrated. Disposed outwardly toward the outer edge of the sorting plate 607 and on the trailing side of the associated hose 627 (the plate 607 being rotated counterclockwise in the direction of the arrow 650) is disposed the other cooperating projection 647, the projection 647 having a height slightly less than that of the associated coin 60, that being a dime as illustrated in FIGS. 25 to 27.

To sort coins using the coin sorter-counter 600, a random mixture of coins is dumped through the hopper 614 and onto the top sorting plate 601, and after a few seconds, only dimes will be positioned on the sorting plate 607 as described more fully hereinabove. The sorting plate 607 will be rotating in the direction of the arrow 650 and about the longitudinal axis of the shaft 615, with the sorting plate 607 inclined at about 30° with respect to the horizontal, whereby the lower side of the plate 607 as viewed in FIG. 25 will be disposed lower and the upper side of the plate 607 as viewed in FIG. 25 will be disposed higher. The dimes will tend to fall to the bottom as viewed in FIG. 25 where the coins will be picked up one-by-one by the pairs of projections 637 to 647. As the coins thus carried by the projections 637 to 647 are moved upwardly and to the right in FIG. 25, eventually only a single coin 60 will be carried thereby; if a second coin should tend to lie on top of the lower coin, then the upper coin will slide downwardly since the projection 647 is lower than the retained coin 60 so that the upper coin will slide to the left as viewed in FIG. 27. As a consequence, as the pairs of projections 637 to 647 approach the top of FIG. 25, they will be holding only a single coin and as they pass the vertical mid-line in FIG. 25, the coins are moving downwardly and will tend to pass outwardly through an opening 657 in the wall of the drum 610.

Disposed at the opening 657 and extending partially thereinto is a track 667 opening downwardly and to the left as viewed in FIG. 25. The width of the track is adjustable by means of a spacer 697, the width of the track being adjusted so as to be only slightly greater than that of the coin to pass therethrough. Also provided is a cover 677 and the height of the spacer 697 is only slightly greater than that of the coin 60, thus to provide a second means of preventing exit of more than one coin at a time from the sorting plate 607 through the opening 657 and into the track 667. The discharge end of the track 667 is disposed at the entry to the appropriate section in the coin vault 690 (see FIG. 1).

It will be appreciated that each of the other sorting plates 601 through 608 is constructed and generally operates like the sorting plate 607 discussed above.

Each of these other sorting plates also has its associated openings 651 through 658 in the drum 610 and is provided with a discharge track, each leading to the appropriate compartment in the coin vault 690.

In order to count the coins one-by-one as they pass through the track 667, a pair of opposed light emitting diodes 687 is provided and the coins passing thereby generate a signal that is fed to the data storage unit to serve as a count of the coins passing through the track 667. Each of the other tracks associated with each of the sorting plates 601 through 608 is likewise provided with light emitting diodes used as a sensor to count the coins one-by-one as they pass through the associated track. In this manner, the coin sorter-counter 600 serves not only to sort but also to count the coins from the coin escrow 530 and to deposit the same into the coin vault 690.

Instead of being inclined at an angle of 60° with respect to the horizontal, the axis of rotation of the sorting plates 601 to 608 may be inclined at an angle of from about 30° to about 75° with respect to the horizontal. The sorting plates 601 to 608 are rotated at a rate from about 30 to about 60 revolutions per minute, the preferred rate being about 45 revolutions per minute. The peripheral speed of the sorting plates 601 to 608 is in the range from about 160 to about 320 feet per minute, the preferred speed being about 240 feet per minute.

Figure 28:
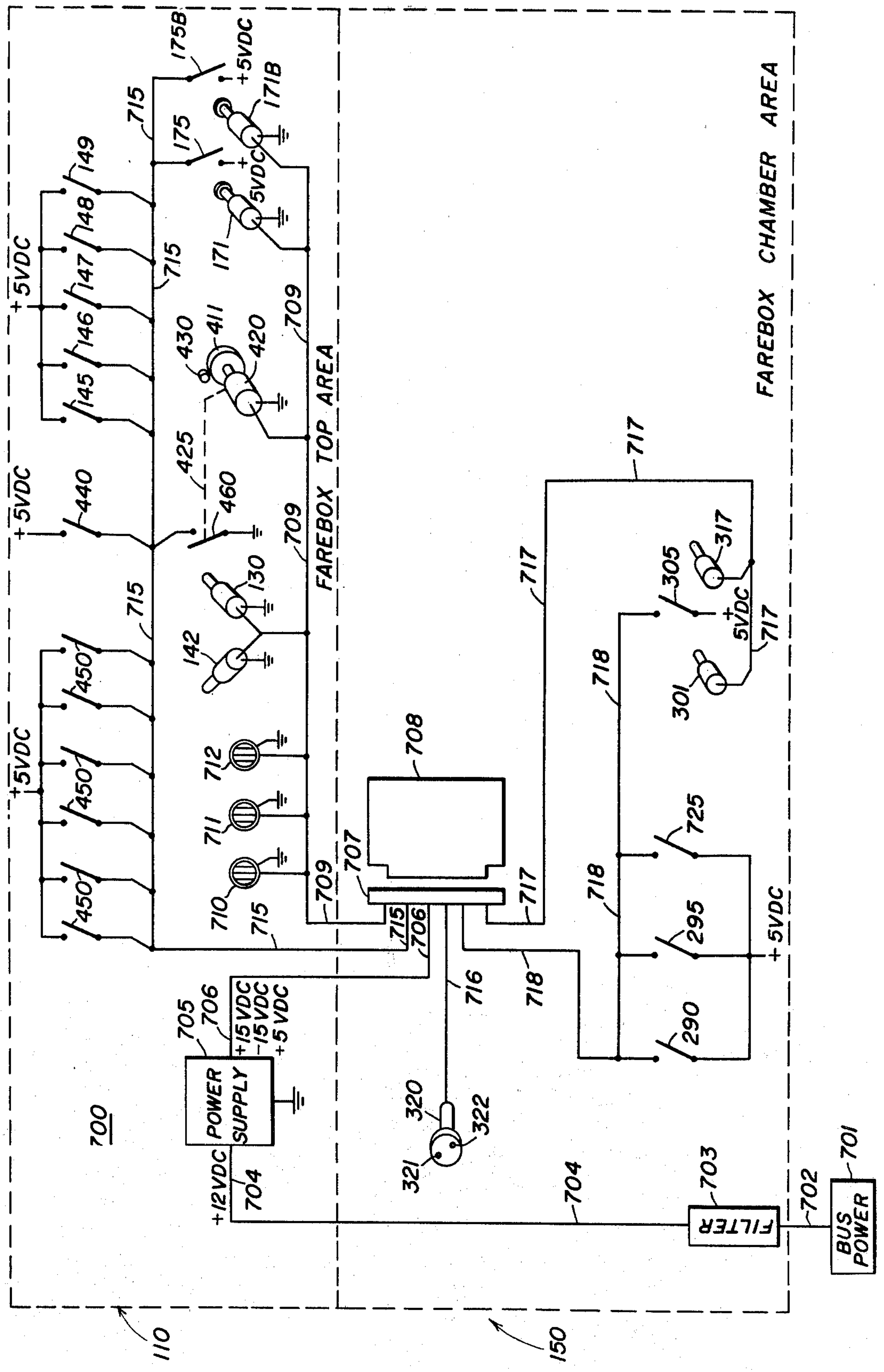
FIG. 28 is an electrical schematic with certain portions diagrammatically illustrated of the electrical circuit in the fare box of the present invention.
Figure 29:
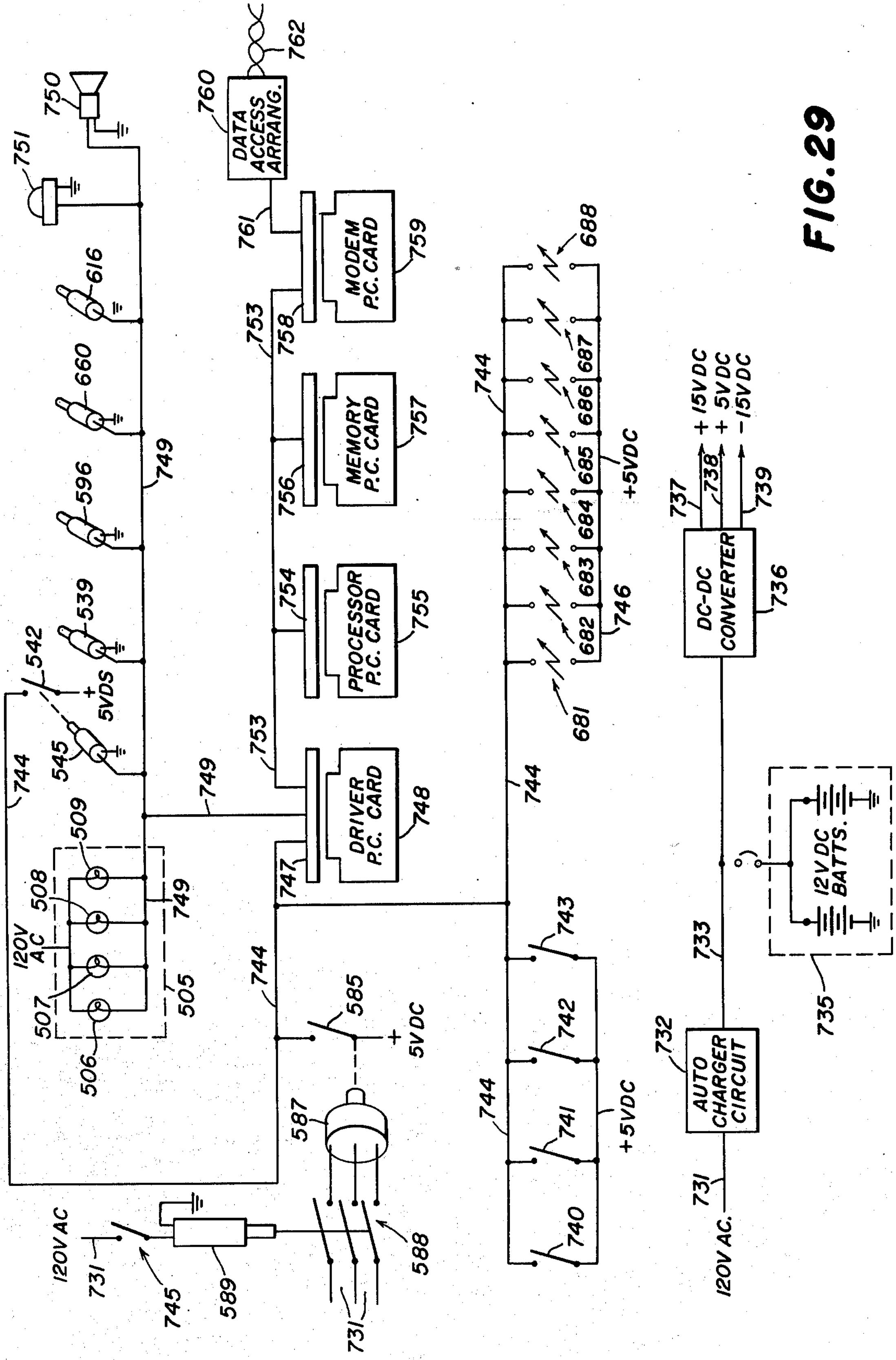
FIG. 29 is an electrical diagram with certain portions illustrated diagrammatically of the electrical circuit in the central processing unit to the present invention.

There is illustrated in FIGS. 28 and 29 of the drawings the electrical circuit for the fare collection system 100 of the present invention. Turning first to FIG. 28, there is illustrated the fare box electrical circuit 700 with the components located in the fare box top 110 disposed at the top of the drawing and the parts disposed in the pedestal 150 disposed toward the bottom of the drawing. Power for the circuit 700 is fundamentally derived from the electrical circuit 701 of the bus 50 through a conductor 702 and a filter 703 to a conductor 704, the power on the conductor 704 being essentially +12 volts D.C. The conductor 704 is the input to a power supply 705 which has the other input terminal thereof grounded, and the output appears on conductors 706 as +15 volts D.C., −15 volts D.C. and +5 volts D.C. The conductor 706 connects to a connector 707 for a printed circuit card 708 which contains the detailed circuitry to accomplish the desired results in the electrical circuit 700. From the connector 707 a first conductor 709 is provided which connects to three beepers 710, 711 and 712, each having a distinctive tone, the beepers being located in the fare box top signalling the different classes of fares recorded by the driver. Also connected to the conductor 709 are the paper dump solenoid 142 and the coin dump solenoid 130 which serve to dump the paper and coins, respectively, after passing by the windows 141 and 125, respectively.

Also connected to the conductor 709 is the paper motor 420 which through the mechanical connection 425 drives the paper length switch 460. Also connected to the conductor 709 are the fare box security solenoid 171 and the access door solenoid 171B which control respectively the fare box security switch 175 and the access door security switch 175B.

Another output from the connector 707 is a conductor 715 to which are connected one terminal of the paper width switches 450, the other terminals thereof being connected to +5 volts D.C. The paper motor start switch 440 also has one terminal connected to the conductor 715 and the other terminal connected to +5 volts D.C., and the paper length switch 460 has one terminal connected to conductor 715. One terminal of each of the passenger classification switches 145 to 149 has one terminal connected to the conductor 715 and the other terminal connected to the +5 volt D.C. conductor. Finally, the fare box security switch 175 and the access door security 175B have one of the terminals thereof connected to the conductor 715 and the other terminal connected to a conductor carrying +5 volts D.C.

Another connection to the connector 707 is a conductor 716 which connects to the optical coupler 320 in the acceptor coupling 230, and specifically provides the power for the light emitting diodes 321 and 322. Yet another output from the connector 707 is on a conductor 717 which connects to one terminal of the paper gate solenoid 317 and the coupling lock solenoid 301, the other terminal thereof being grounded. Another connection to the connector 707 is a conductor 718 to which is connected one of the terminals of the coupling lock open switch 305 which has the other terminal connected to a conductor carrying +5 volts D.C. Also connected to the conductor 718 are one terminal each of the chamber closed switch 290, the chamber open switch 295 and the chamber empty switch 725, the other terminals of each of those switches being connected to a conductor carrying +5 volts D.C.

There is illustrated in FIG. 29 of the drawings the electrical circuit 730 for the central processing unit 500. Voltage to operate the electrical circuit 730 is derived fundamentally from a 120 volt A.C. source 731 to which is connected an automatic charger circuit 732 having as an output a D.C. potential on a conductor 733 which is used both to charge a standby battery supply 735 and a D.C.-to-D.C. converter 736. The output from the converter 736 is threefold, one of the output conductors 737 carrying +15 volts D.C., another output conductor 738 carrying −5 volts D.C. and a third output conductor 739 carrying −15 volts D.C.

A conductor 744 is provided which is connected to one terminal of each of sorter door switch 740, a maintenance door switch 741, a vault door switch 742 and a vault sensing switch 743, the other terminals of each of the main switches being connected to a conductor carrying +5 volts D.C. The conductor 744 also is connected to one terminal of the optical switches 681 through 688 that count the coins delivered from the sorting plates 601–608, respectively, the other terminal of each of the counting switches 681 to 688 being connected to a conductor 746 carrying +5 volts D.C.

The conductor 744 also is connected to a connector 747 for a driver printed circuit card 748, and one of the outputs thereof appears on the conductor 749, the conductor 749 being connected to one terminal of status lamps 506 through 509 in the control panel 505 with the other terminals of the lamps being connected to 120 volts A.C. Also connected to the conductor 749 is one terminal of the escrow door valve solenoid 545, the escrow bleeder valve solenoid 539, the pulsing valve solenoid 596, the sorter trap door solenoid 660 and the sorter motor 616, the other terminals of all of the devices mentioned being connected to ground. Finally, there is connected to the conductor 749 a sound alarm 750 and a beacon alarm 751 which are located to sound an alarm in the event an alarm is indicated because of a misuse or malfunction of any portion of the central processing unit 500 or the connected fare box 105. The escrow door solenoid 545 has associated therewith the escrow door sensing switch 542 which has one terminal connected to the conductor 744 and the other terminal connected to a conductor carrying +5 volts D.C.

Another output from the connector 747 of the driver printed circuit card 748 appears on the control bus wiring designated by the numeral 753. To the control bus 753 are connected a first connector 754 for a processor printed circuit card 755, a connector 756 for a memory printed circuit card 757, and a connector 758 for a MODEM printed circuit card 759. Also connected to the connector 758 is an output bus 761 to a data access arrangement 760 which in turn is connected by telephone lines 762 to a remote computer facility (not illustrated).

Figure 30:
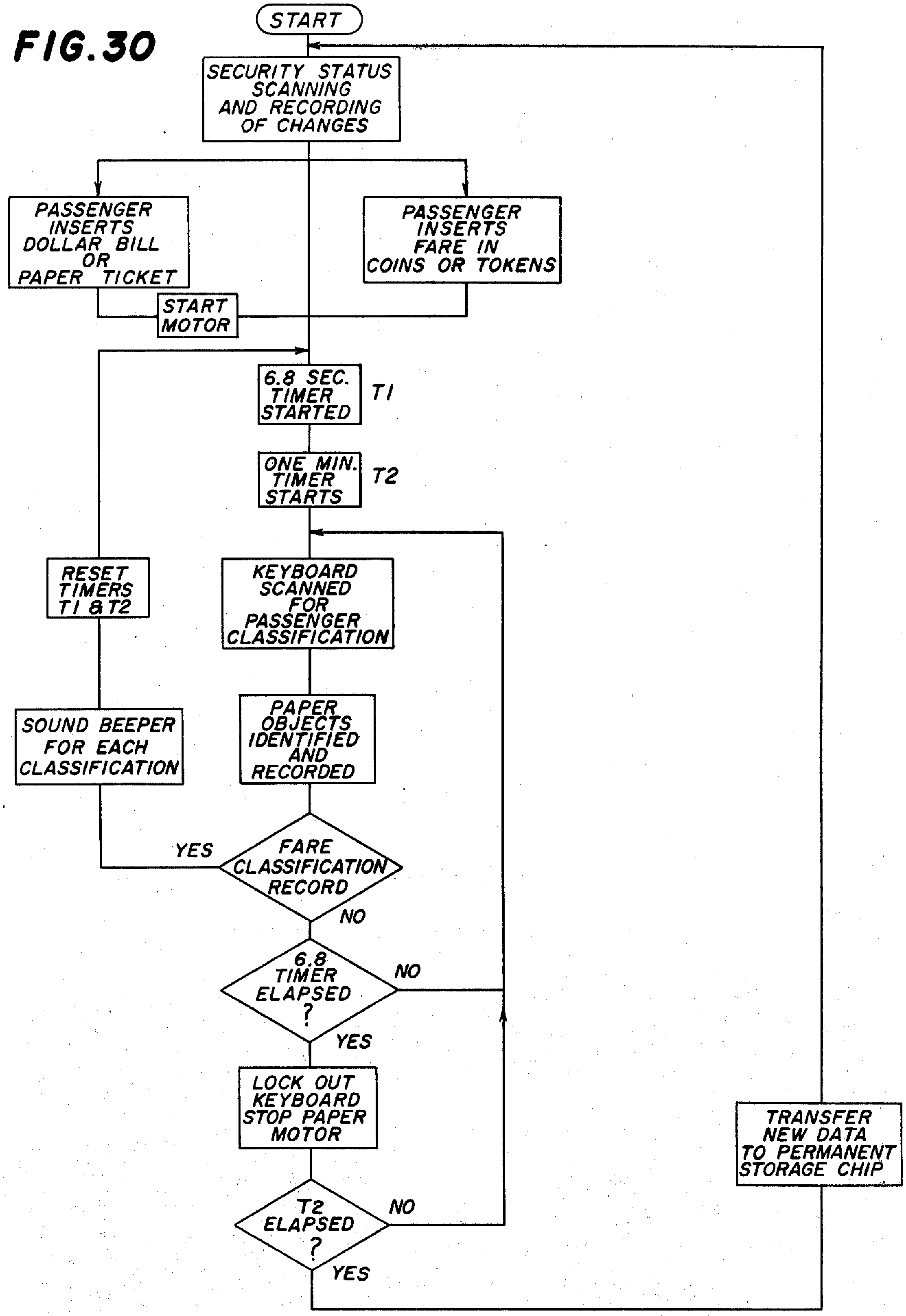
FIG. 30 is a functional flow diagram illustrating the manner in which fare box data is collected and recorded.

A typical cycle of operation of data collection and recordal in the fare collection system 100 will now be described using the foregoing drawings including FIGS. 1 to 30, with particular reference to FIG. 1, and utilizing the fare box data collection and recording functional flow diagram illustrated in FIG. 30 of the drawings. It is assumed that the bus 50 is on its route with the fare box 105 in place and with the electrical circuit 700 of FIG. 28 connected and operating. A passenger boards the bus 50 and approaches the fare box 150. Security status scanning and recording of any changes is proceeding constantly under the direction of the circuitry in the printed circuit card 708. The passenger then inserts his fare, in the form of coins or tokens, or in the form of a dollar bill or a paper transfer or a ticket. Insertion of the paper will start the paper motor 420 and cause the paper to be measured and counted as described above and the results thereof recorded in the data storage unit in the fare box 105. At this time a 6.8 second timer is started and a one minute timer also starts. The keyboard containing the fare classification switches 145 to 149 is scanned for passenger classification. By this time the paper objects inserted in the paper slot 140 had been identified and recorded. If the fare classification is recorded by the bus operator depressing one of the buttons to close associated switch 145 to 147, then the appropriate beeper 710 to 712 is sounded and the timers are reset. If the 6.8 seconds has elapsed and no fare classification recorded, then the keyboard containing the switches 145 to 149 is locked out and the paper motor 420 is automatically stopped. At the end of the one minute timer, the new data is transferred to permanent storage and the cycle is ready to begin again. The process is repeated as fares are collected, and at the end of a shift, there will be a plurality of paper pieces in the paper chamber 200 and a plurality of coins in the coin chamber 210 as will as fare classification data and other such data including vehicle indentification and mileage driven by the bus 50 in the data storage unit.

At the end of a shift, the bus 50 returns to a garage or central station where is located one of the central processing units 500 of FIG. 1. As explained before, the central processing unit 500 is equipped to handle two buses simultaneously, but in the following explanation it will be assumed that only one bus is being handled using one of the sets of equipment in the central processing unit 500.

Figure 31:
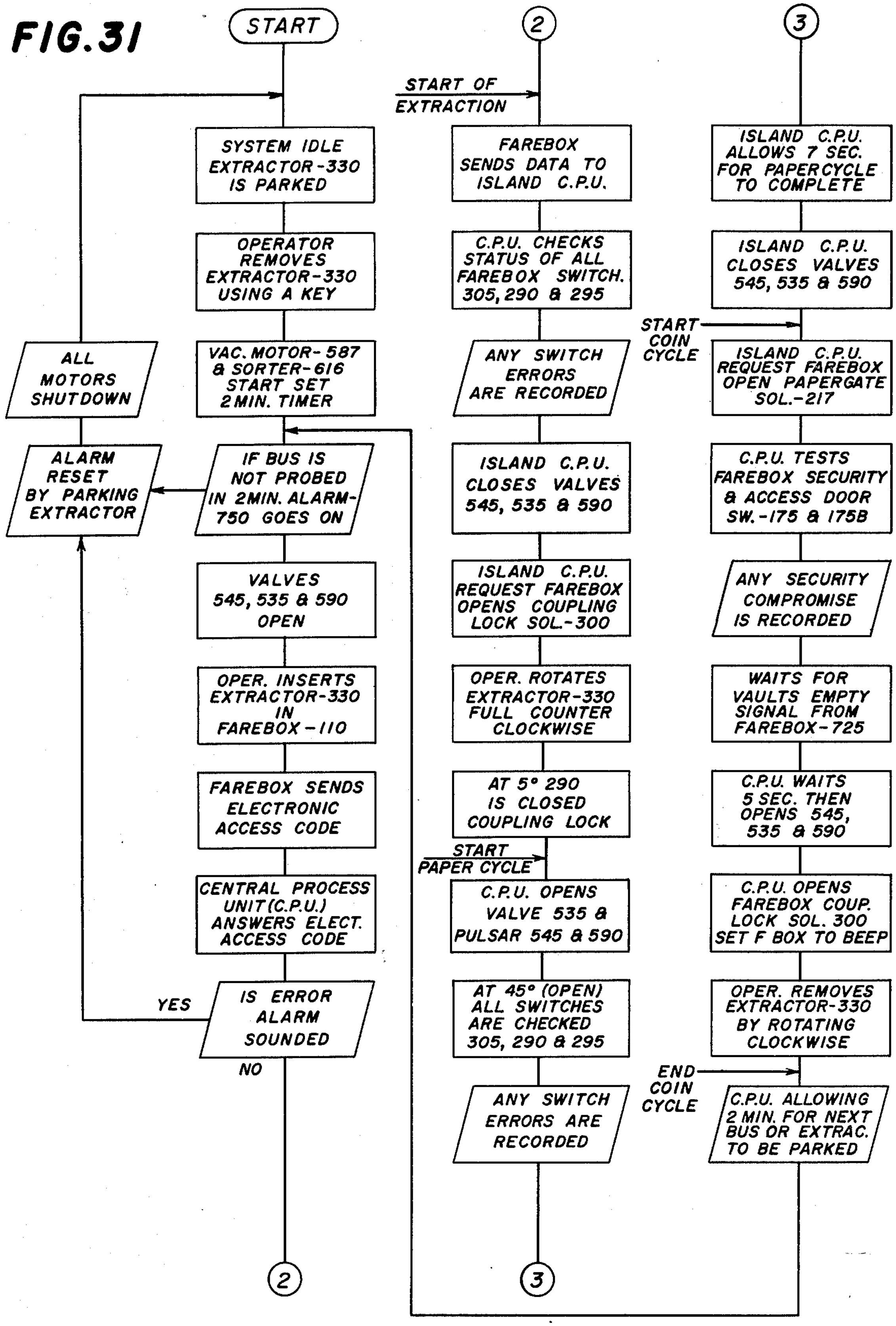
FIG. 31 is a flow diagram illustrating the manner in which the contents of the fare box are extracted and pneumatically conveyed to the central processing unit.

To aid in this explanation, there is illustrated in FIG. 31 of the drawings a flow diagram of the process by which the central processing unit 500 extracts the contents of the coin chamber and counts the same and records the count, as well as extracting the paper from the paper chamber 200. The cycle starts at the upper left of FIG. 31 with the extraction system idle and the extractor coupling 330 parked in its receptacle or mount 670 in the central processing unit 500. The operator removes the extractor coupling 330 using a key in the lock 680, this action starting the vacuum pump motor 587 and the coin sorter-counter motor 616, as well as a two minute timer. If a fare box 105 is not probed within the two minute interval as determined by the two minute timer, then the alarm 750 sounds and the system must be restarted by replacing the extractor coupling 330 in its mount 670 which resets the alarm 750 and stops the motors 587 and 616.

Assuming that the fare box 105 has the extractor 330 inserted therein within the two minutes set by the timer, the escrow door 540 is opened, the escrow bleeder valve 535 is opened and the pulsing valve 590 is energized to close the opening 595 so that no vacuum is applied through the hose 340. The operator then inserts the extractor coupling 330 in the acceptor coupling 230, and specifically places the nose 365 in the aligned square openings 245 and 255 and in so doing also places data transmission connection 320 of the acceptor coupling 230 in optical connection with the data connection 380 in the extractor coupling 330. The fare box 105 then sends the electronic access code (to be explained more fully hereinafter) to the central processing unit 500, and the central processing unit 500 then answers the electronic access code. If error is found, the alarm 750 is sounded, all motors are shut down, and the parts returned to the "start" condition. If no error is found, then the program moves to the area labeled "Start of Extraction". The fare box 105 data collection unit then sends data to the central processing unit, and the central processing unit checks the status of all of the fare box switches, including the coin sensing switch 214, the coupling lock solenoid switch 305, the fully closed position switch 290 and the fully open position switch 295; any switch errors are recorded. The central processing unit 500 then closes the escrow door 540 by way of the motor 545, closes the escrow bleeder valve 535 and begins the pulsing of the pulsing valve 590.

The central processing unit 500 then requests that the fare box open the coupling lock solenoid 300; application of the vacuum through the hose 340 to the extractor coupling 330 actuates the vacuum security locks 310 and 370 to the unlocked positions thereof. Accordingly, the operator can now rotate the handle 355 which serves to rotate the security plate 360 on the extractor coupling 330 and the security plate 231 in the acceptor coupling 230 from the fully closed position illustrated in FIG. 16 toward the fully opened position illustrated in FIG. 17, the total rotation required being 45°. After 5° of rotation, the switch 290 is opened which de-energizes the solenoid 301 and thus permits the latch pin 303 to move to a position such that it will be cammed into the latching position should the operator return the handle 355 and the attached security plates 231 and 360 to the fully closed positions.

The paper cycle, i.e., the withdrawal of paper from the paper chamber 200, now starts. The escrow bleeder valve 535 is opened, and the escrow door motor 545 is opened and the pulsing valve 590 is pulsed, this serving to withdraw all of the paper from the paper chamber in an interval of no more than seven seconds. After rotation of the handle 355 and the connected security plates 360 and 231 to the fully open position (45° of rotation) all switches are checked by the central processing unit 500, including the coupling door solenoid switch 305, the fully closed switch 290 on the acceptor coupling, the fully opened switch 295 on the acceptor coupling and the coin sensor 214; any switch errors are recorded. The central processing unit allows seven seconds for the complete withdrawal of paper from the paper chamber 200 (see FIG. 14), after which the central processing unit closes the escrow door 540, the escrow bleeder valve 535 and the pulsing valve 590, i.e., closes the air inlet 596 and opens the opening 595.

The system is now ready to start a coin cycle, i.e., extraction of the coins from the coin chamber 210 of FIG. 14. The central processing unit 500 requests the fare box 105 to open the paper gate 215 by actuating the solenoid 315, thus to withdraw the latch 318 to permit the spring 274 to open the gate 215. The central processing unit 500 then tests the fare box security and access door switches 175 and 175B, respectively; any security compromise is recorded. The central processing unit 500 awaits for the signal from the chamber empty switch 725 indicating the completion of the removal of coins from the coin chamber 210 and the discharge chamber 205. After actuation of the switch 725, the central processing unit 500 waits five seconds and then opens the escrow door 540 by actuating its motor 545, opens the escrow bleeder valve 535 and opens the pulsing valve 590, i.e., closes the opening 595. The coupling lock solenoid 301 is energized to withdraw the pin 303 so as to permit subsequent return of the acceptor coupling 230 to its closed position. This is the end of the coin extraction cycle.

The operator then rotates the handle 355 and the associated parts of the extractor coupling 330 and the acceptor coupling 230 to the fully closed positions. The central processing unit 500 then starts a timer measuring a two minute time interval during which the next bus 50 should have the fare box 105 thereof probed by the extractor coupling 330, or the extractor coupling 330 should be returned to its mount 670, failure of either of these events to occur causing the alarm 750 to sound. The apparatus is now ready for the next cycle of operation.

The data communication protocol between a fare box 105 and the central processing unit 500 will now be described more fully with reference to FIGS. 32 and 33, the data format being set forth in FIG. 34. The central processing unit 500 initiates a request for status (RFS) in a suitable generator and this is fed to the security scanning and recording circuit in the fare box 105. The first Request For Status contains Null Data Fields, but initiates the selection of a random number for the start and end fields. There is then transmitted from the fare box 105 to the central processing unit 500 a password, such as "noon", and the central processing unit 500 then calculates a suitable reply and adds a command which is transmitted back to the fare box 105; in the meantime, the fare box has calculated a suitable reply and these replies are then compared in the fare box 105. If the reply is incorrect, the cycle is interrupted and the system recycled, i.e., returned for the selection of another random number for the start and end fields. If the reply is correct, than the fare box moves to a release status and accepts a command, this information being transmitted to the central processing unit 500. A reply is calculated and command A is added, command A being to "apply vacuum", and this composite reply returned to the fare box 105. If the reply is not correct, then the cycle is interrupted and the system recycled. If the reply is correct, then the cycle continues, see FIG. 33.

The fare box 105 is now again in a release status and capable of accepting a command, which fact is transmitted to the central processing unit 500 where a reply is calculated and a command added, this being command B to energize the coupling lock solenoid 301. This is then transmitted to the fare box 105, and if the reply is incorrect, then the processing is recycled, but if the reply is correct, the system proceeds to the next step which is a new release status and accept command. This again is transmitted to the central processing unit 500 where a reply is calculated and command C is added that the coupling lock solenoid 301 be deenergized or released. This is transmitted to the fare box 105 and if not correct, the cycle is interrupted and will start again, but if correct, a new release status and accept command condition is created. This is transmitted to the central processing unit 500 where a reply is calculated and a command is added, this being command D for data removal. This message is transmitted to the fare box 105, and if not correct, the cycle is interrupted and restarted; if correct, a new release status and accept command condition is created and this is transmitted to the central processing unit 500. A new reply is calculated and command E. is added, the command E being that the fare box 105 be cleared, i.e., the former status records be removed from the data collection unit. This new composite signal is then returned to the fare box 105, and if incorrect, the cycle is interrupted and begun again; if correct, the data communication protocol is now complete and the system is returned to security scanning and recording.

Figure 32:
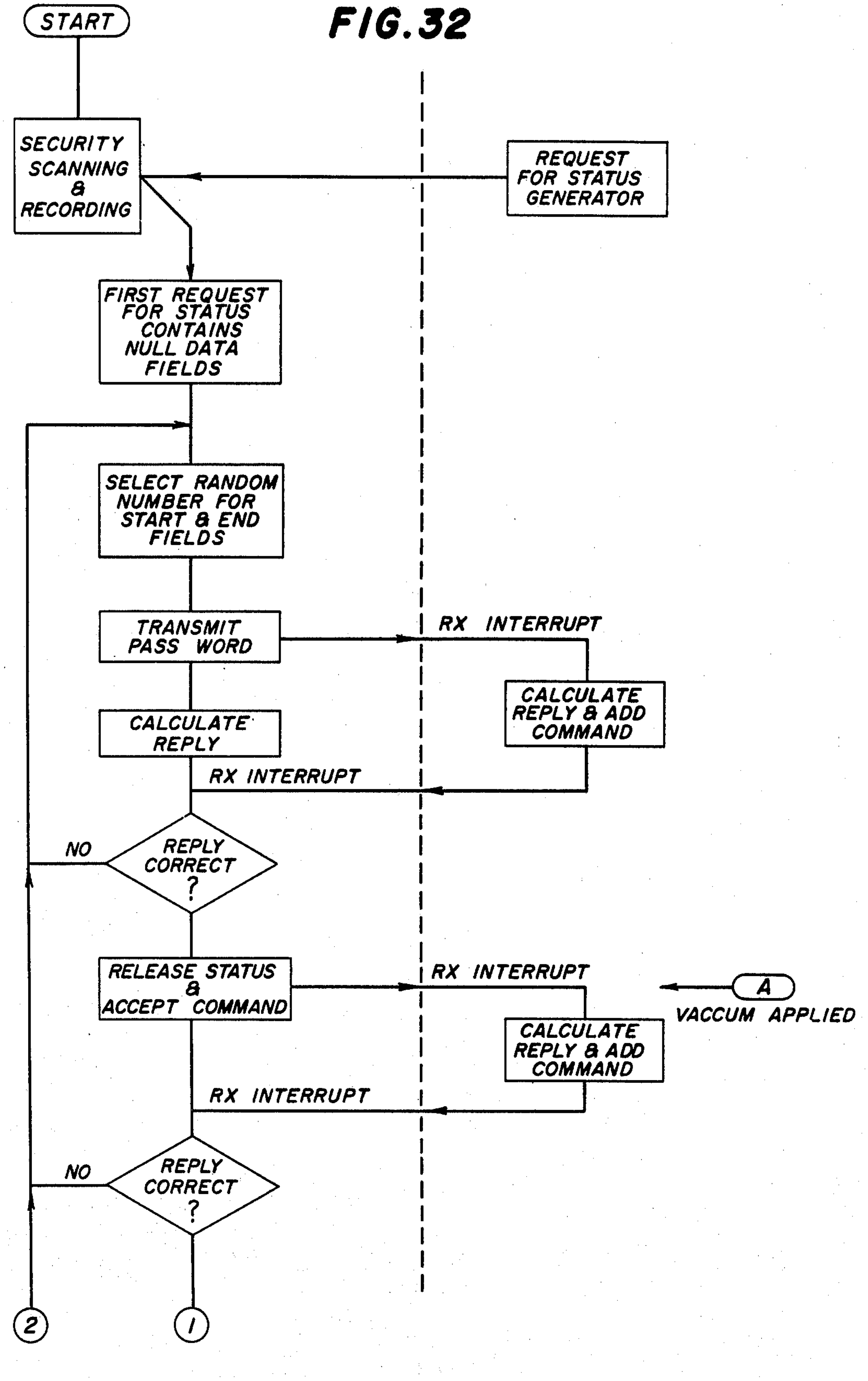
FIGS. 32 and 33 taken together diagrammatically illustrate the data communication protocol between the fare box and the central processing unit of the present invention.
Figure 33:
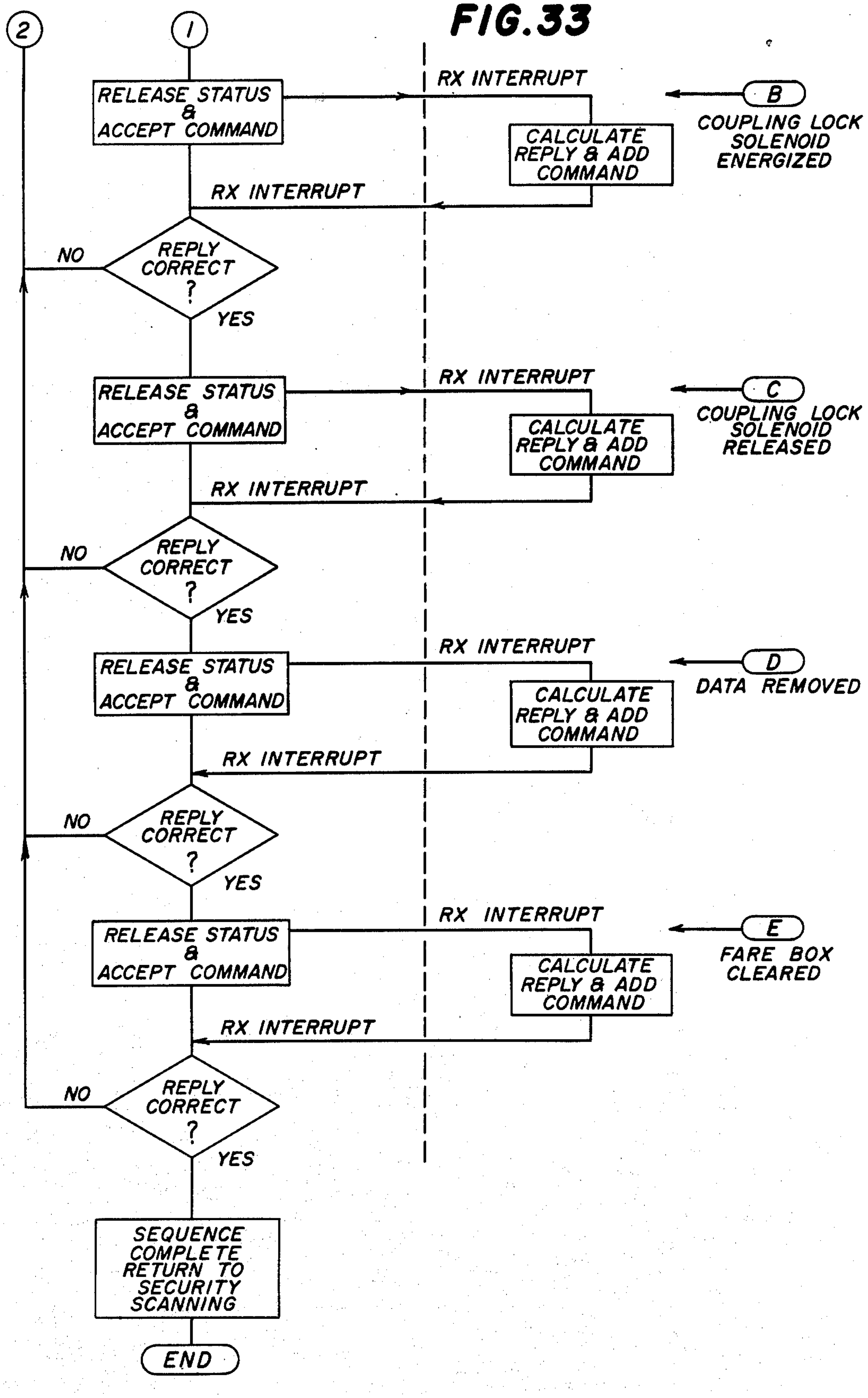
Figure 34:
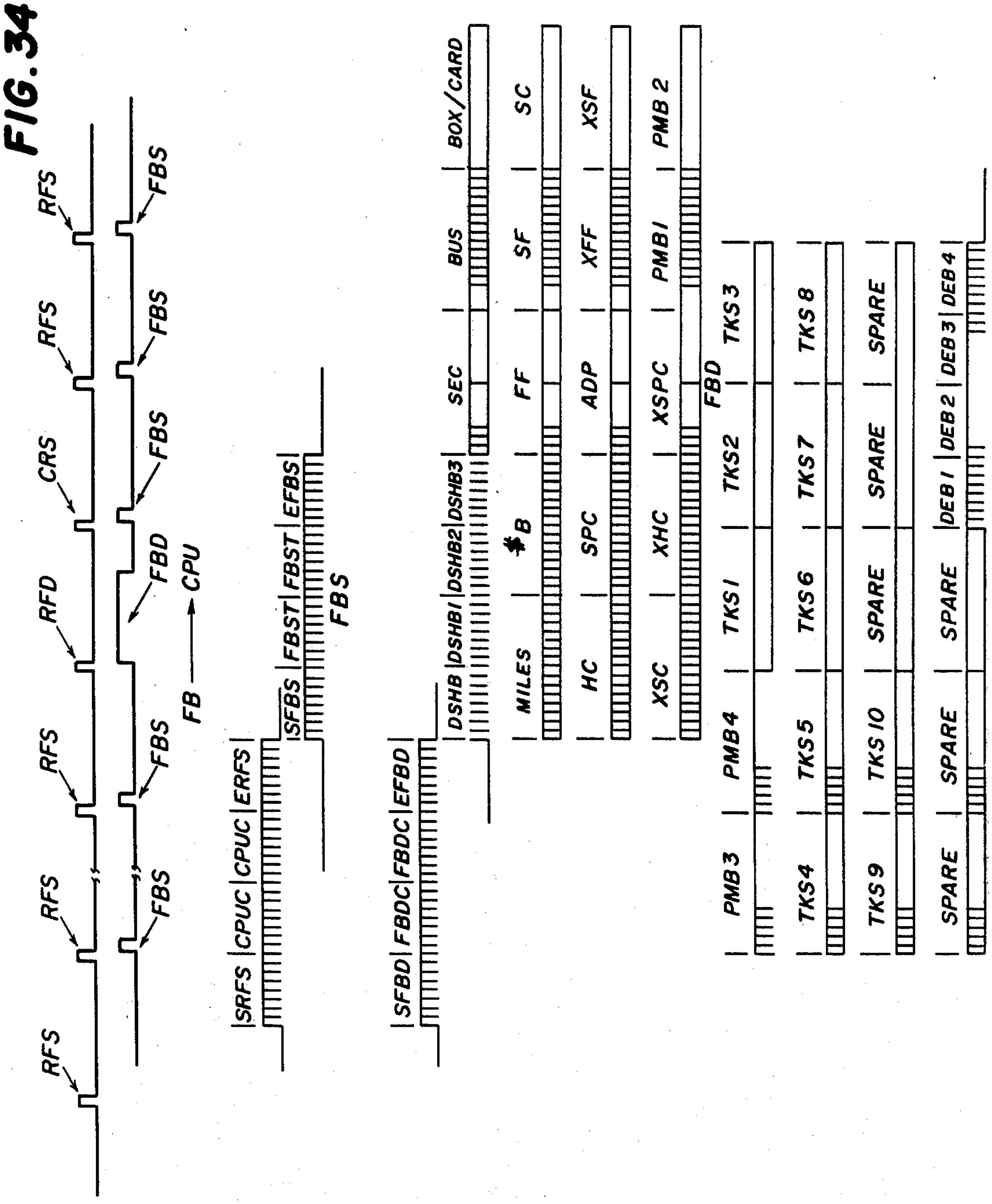
FIG. 34 is a diagrammatic illustration of the data format used in the transmission of data between the fare box and the central processing unit of the present invention.
Figure 35:
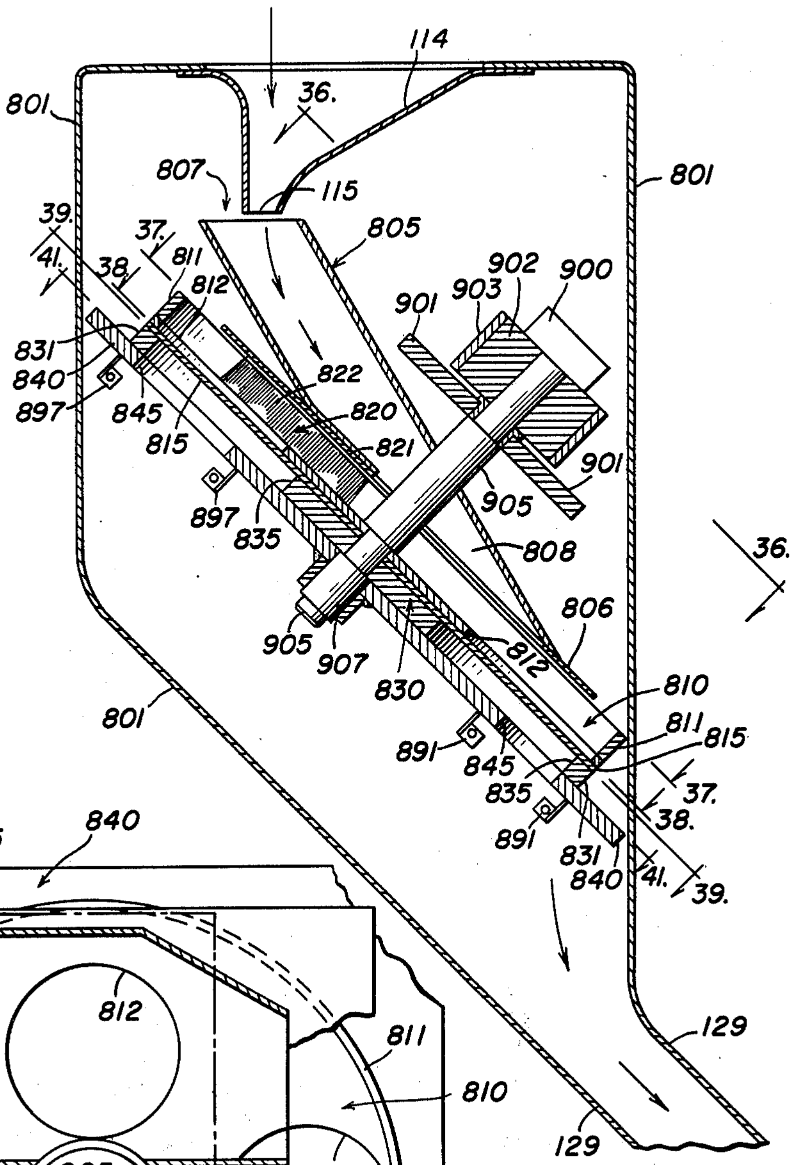
FIG. 35 is an enlarged view in section along the line 35—35 of FIG. 3 and showing the coin registering device forming a part of the fare collection system of the present invention.
Figure 36:
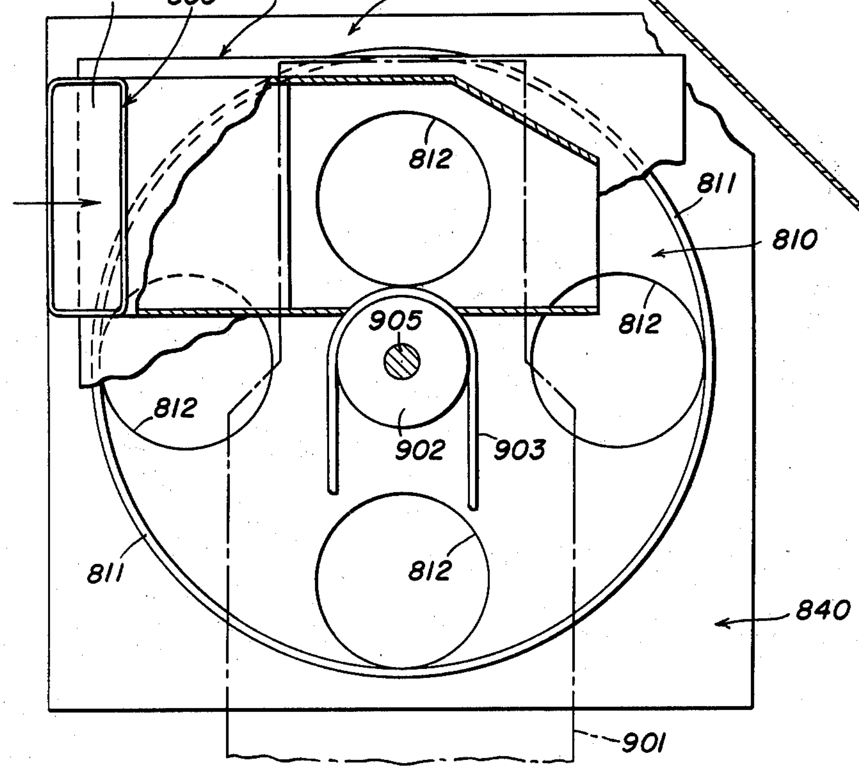
FIG. 36 is a view in section along the line 36—36 of FIG. 35.
Figure 37:
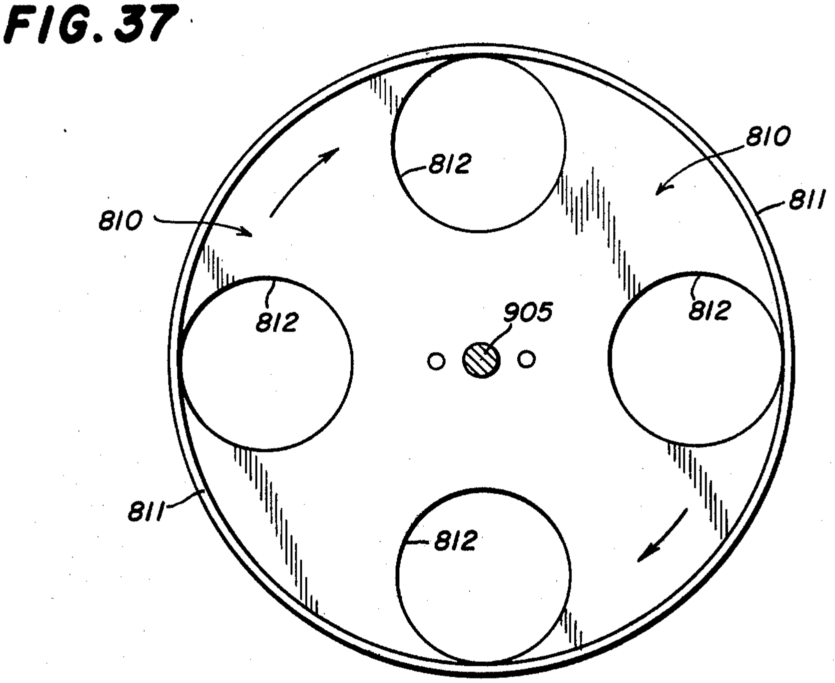
FIG. 37 is a view in section along the line 37—37 of FIG. 35 and illustrating the singulator plate.
Figure 38:
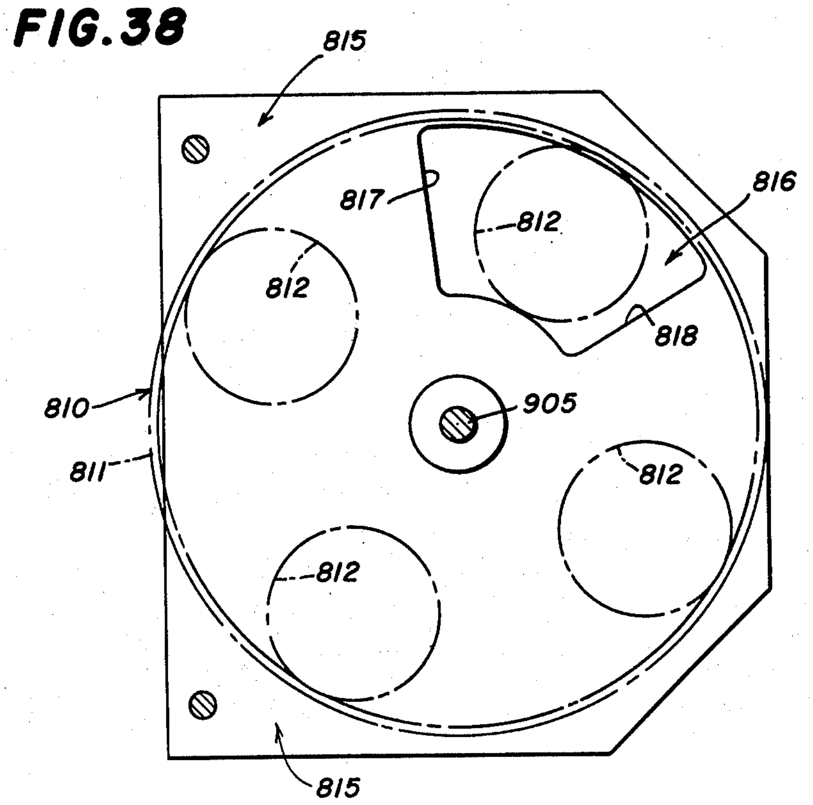
FIG. 38 is a view in section along the line 38—38 of FIG. 35 and illustrating the by-pass plate.

The data format for the data communication protocol illustrated in FIGS. 32 and 33 is set forth in FIG. 34. The status cycle is initiated by the request for status (RFS) pulses initiated by the central processing unit 500 at regular intervals, see the top line in FIG. 34, and this elicits a response from the fare box 105 in the form of the fare box status response (FBS) pulse, see the second line in FIG. 34. Line 3 shows the expanded content of the RFS request pulse which includes four bytes SRFS (start sequence for status), CPUC (central processing unit command), a second CPUC and ERFS (end request for status from central processing unit). The fourth line shows the expanded content of each of the FBS pulses, including SFBS (start fare box status response), FBST (fare box status), a second FBST and EFBS (end fare box status response).

If a fare box 105 is availabale and the extractor coupling 330 is disposed in the acceptor coupling 230 with the data transmission connection established, then after the next RFS pulse, the next FBS pulse will be a report pulse that will cause the central processing unit to generate a RFD (request for data) pulse which then initiates a FBD (fare box data) pulse. The details of the RFD pulse are illustrated on line 5 of FIG. 34 and includes four bytes, namely, SFBD (status fare box data), FBDC (fare box data command), a second FBDC and EFBD (end fare box data). The balance of FIG. 34 shows the format of the FBD transmission. These include DSHBO (data start header byte zero) and DSHB1, DSHB2 and DSHB3. The next is a SEC (security) byte giving the condition of the coupling lock solenoid switch 305, the fully closed switch 290 and the fully opened switch 295. The next byte gives the bus number, and the next byte the fare box or electronic card number, if any. In the following line the bytes includes those for the miles driven by the bus, the dollar bills collected, the full fares collected, the student fares collected, and the senior citizens fares collected. The next line is the HC fares accepted, the SPC fares accepted, the ADP (automatic dump of coins and paper) byte, and the last two bytes are extra bytes for full fare and student fare, as are the first three bytes on the next line, XSC, XHC, and XSPC. The next byte is the partition marker byte 1 PMB1 followed by partition marker bytes 2, 3, and 4. Next are the ticket or transfer bytes designated TKS1 through TKS10 followed by 6 SPARE Bytes. Finally there are at the righthand end of the bottommost line four data end bytes DEB1 through DEB4.

At the conclusion of the FBD cycle, the central processing unit 500 generates a CRS (clear fare box status) pulse, after which both the fare box 105 returns to the FBS pulse cycle and the central processing unit 500 returns to the RFS pulse cycle until an extractor probe 330 again is inserted in the fare box acceptor coupling 230.

Referring to FIGS. 35 to 44 of the drawings, there is illustrated the construction and operation of a coin registering device 800 that may be used in the fare box 105 to give a verifying count of the coins deposited in the coin slot 115, which verifying count can be compared with the count obtained in the coin sorter-counter 600 described above. The coin registering device 800 is disposed immediately below the coin slot 115 in the upper portion 117 and discharges the coins therefrom into the upper coin chute 129 (see FIGS. 2, 3 and 4 also).

The coin registering device 800 is provided with a surrounding housing 801 into which at the upper end extends the infeed hopper 114 with the coin slot 115 therein. Coins from the slot 115 fall into a coin chute 805 for the coin registering device 800, the coin chute 805 having a mounting flange 806 for mounting on the housing 801 and having at the upper end a coin receiving inlet 807 and at the lower end a coin outlet 808. Disposed below the coin outlet 808 is a singulator plate 810 which is generally circular in shape (see FIG. 37 also) around which is provided an upstanding rim 811. Disposed equiangularly around the plate 810 and touching the rim 811 are four coin openings 812, the openings 812 being large enough to pass a 50 cent piece, that being the largest coin to be handled by the coin registering device 800. The singulator plate 810 is rotated in a clockwise direction as viewed in FIG. 37 and receives coins thereon that are retained by the rim 811 and individually fall into the openings 812. The diameter of the openings 812 is such that only a single coin can lie therein at any time, i.e., even two of the smallest coins being handled cannot lie flat within an opening 812. Furthermore, the thickness of the singulator plate 810 is only 0.03 inch so that only a single coin can be stacked therein, the single coin extending above the upper surface of the singulator plate 810.

Mounted immediately below the singulator plate 810 is a fixed by-pass plate 815 (see FIG. 38) which has therein an arcuately shaped coin slot 816. The trailing edge of the slot 816 is disposed approximately 7° to the left or counterclockwise from a vertical line in FIG. 38, the coin slot 816 extending then in an arcuate direction to the right or clockwise to a leading edge 816 that is disposed 67° clockwise with respect to the trailing edge 817. The radial extent of the slot 816 is sufficient to receive the largest coin to be handled, namely, a U.S. 50 cent piece. Disposed in the center of the plate 815 is an opening 816 to receive a drive shaft to be described more fully hereinafter.

Mounted above the singulator plate 810 and upon the coin chute 815 is a brush 820 having a frame 821 secured to the coin chute 805 and having depending bristles 822 that brush upon the surface of the singulator plate 810 and that will wipe any coins that are lying upon coins in the openings 812 away therefrom so as to have only one coin in an opening 812 at any time.

Rotatably mounted below the by-pass plate 815 for receiving coins therefrom one at a time is a coin carrier 830 that is generally circular in shape and may be best seen in FIGS. 39 and 40. Four pockets 835 are equiangularly arranged in the coin carrier 830 and provide an outer rim 831 for each of the pockets 835. Each of the pockets 835 has a trailing edge 836, i.e., the coin carrier 830 is rotated in operation in a clockwise direction, each of the trailing edges 836 being disposed at an acute angle with respect to the associated rim section 831 to urge the associated coins toward the apex 838 therebetween. Each of the trailing edges 836 also carries an undercut bevel which provides an overlying flange 837 and extends into the apex 838 so that each of the coins is urged not only in a rotating direction but also downwardly and toward the apex 838 by the flange 837. The thickness of the coin carrier 830 is approximately 0.187 each, whereby it is thicker than any coin to be handled thereby.

Fixedly mounted below the coin carrier 830 is a selector plate 840 which is generally square in shape and has an upper surface 841 arranged closely adjacent to the lower surface of a coin carrier 830, see FIGS. 41 to 44. In this fashion the upper surface 841 on the selector 840 tends to close the open bottom pockets 845 on the coin carrier 830, whereby the coin carrier 830 carries coins in its pockets 835 around the selector plate 840 along a predetermined path. Disposed in and underlying the predetermined path of the travel of coins in the pockets 835 is a slot 845 in the selector plate 840, the slot 845 extending arcuately for 300°. The beginning edge 846 of the slot 845 is disposed 60° from the vertical as viewed in FIG. 41, and the slot 845 extends then 300° and has an ending edge 847 disposed radially and on the vertical center line in FIG. 41. Cut into the upper surface 841 of the selector plate 840 is an outer track 850 that has a first section 851 extending from the beginning edge 846 down to a point 853. From the point 853 a second section 852 extend arcuately to an end 855 that is spaced from the ending edge 847. The first track section 851 has a width of about 0.053 and tapers downwardly from the surface 841 to the second section 852, while the second outer track section 852 has a width of about 0.053 inch and a uniform depth of about 0.020 inch.

Extending along the inner edge of the slot 845 is an inner track 860 made up of seven successive track sections 861 to 867, respectively. Each of the inner track sections 861 to 867 has a terminal end 871 to 877, respectively, the inner track sections 861 to 867 each tapering from the upper surface 841 of the selector plate 840 down to an associated end 871 to 877 respectively, see FIG. 42 also. The first inner track section 861 starts at the beginning edge 846 and defines with the outer track 850 an opening 881 which is arcuate in shape and of a size to pass the smallest coin or token to be handled by the coin registering device 800. Each of the inner track sections 862 to 867 likewise cooperate with the outer track 850 to defined arcuate openings 882 to 887, respectively. Each of the openings 882 to 887 accommodates a different size coin, opening 882 accommodating a U.S. 10 cent piece, opening 883 accommodating a U.S. 1 cent piece, opening 884 accommodating an intermediate size token, opening 885 accommodating a U.S. 5 cent piece, opening 886 accommodating a large size token, and opening 887 accommodating a U.S. 25 cent piece. The clockwise most portion of the slot 845 provides an opening 888 which has no inner track section associated therewith and which accommodates a U.S. 50 cent piece.

Disposed below each of the openings 881 through 888 is a coin sensor in the form of a light emitting diode 891 to 898, respectively. The light emitting diode is actuated each time a coin passes thereby so as to count the coins passing through each of the openings 881 to 888, respectively.

Drive for the singulator plate 810 and the coin carrier 830 is provided by a motor 900 on a motor base 901 secured to the housing 801. A shaft 805 having its axis at an angle of 45° is provided journalled in bearings 906 and 907 respectively disposed in the motor base 901 and the selector plate 840. The angle of inclination may vary between 35° and 55°, poor singulation of coins occurring at angles less than 35° and efficiency of pick-up of coins in the openings 812 of the singulator plate 810 being impaired at angles of more than 55°. The upper end of the shaft 905 carries a pulley 902 secured by a belt 903 to the output of the motor 900. The motor 900 serves to drive the singulator plate 810 and the coin carrier 830 in a clockwise direction as viewed in FIGS. 36, 37 and 39, and at a rate of 105 revolutions per minute. The rate of operation may be as little as 90 revolutions per minute or as great as 120 revolutions per minute, coin registering capacity being impaired at rates lower than the lower rate and coin registering efficiency being impaired at rates greater than the higher rate. The peripheral speed of the coin carrier 830 varies from about 100 to about 135 linear feet per minute, the preferred rate being 115 linear feet per minute.

In the operation of the coin registering device 800, coins are fed through the slot 115 and into the coin chute 805 and fall upon the upper surface of the rotating singulating plate 810. The coins are retained on the singulating plate 810 by its rim 811 and eventually fall into one of the openings 812. As explained heretofore, the openings 812 have a diameter and the plate 810 has a thickness such that only a single coin can rest within an opening 812 and upon the underlying by-pass plate 815. The slot 816 in the plate 815 is disposed on the high side thereof. Any coins that pile upon those already in an opening 812 so as to be "piggy-backing" therewith are brushed away by the brush 820. Accordingly, a single coin with an opening 812 is fed into the coin slot 816 in the by-pass plate 815, with the by-pass plate 815 in a sense serving as the bottom for the open bottom openings 812. The singulator plate 810 is rotating in a clockwise direction so that the coins approach the slot 816 from below and the left and fall one-by-one downwardly through the coin slot 816 in the plate 815. In this fashion, the coins are singulated, i.e., fed one at a time from the coin chute 805 through the coin slot 816.

Disposed immediately below the by-pass plate 815 is the coin carrier 830 with its four open bottom pockets 835 therein. It will be appreciated that the coin carrier 830 is also being rotated at the same rate as and simultaneously with the singulator plate 810, whereby the coin carrier 830 rotates in a clockwise direction. As each of its pockets 835 passes upwardly and beneath the coin slot 816, that coin pocket 835 will receive a single coin through the slot 816, provided that a coin is in the slot 816. It further will be noted that the bottom of the coin pocket 835 will then be closed by the upper surface 841 of the selector plate 840, the coin pocket 835 that has just received a coin from the slot 816 still being disposed counterclockwise and upwardly with respect to the beginning edge 846 of the slot 845. The thickness of the coin carrier 835 accommodates any thickness of coin to be handled thereby and furthermore the coin will be quickly moved toward the adjacent apex 838 and will be held downwardly against the surface 841 by the overlying retaining flange 837 on the trailing edge 836 of the associated pocket 835, and one edge of the coin will be disposed against the inner surface of the associated rim 831, the parts being held in this position also by centrifugal force.

The inner edge of the rim 831 on the coin carrier 830 overlies the outer track 850 on the selector plate 840, whereby the outer edge of the coin in the pocket 835 will lie upon and be supported by the outer track 850. The inner edge of the coin in the coin pocket 835 will either be carried by or will overlie the inner track 860 on the selector plate 840, this depending upon the diameter of the coin in the pocket 835. Assuming that the coin is of the smallest diameter to be handled, it will find no support for its inner edge, and accordingly it will fall through the opening 881 and pass the associated light emitting diode 891 to be counted thereby.

Assuming that the next larger coin is being fed, and specifically a U.S. 10 cent piece, the inner edge thereof is supported on the inner track section 861. The inner track section 861 tapers downwardly and when the coin reaches the end 871, it will fall into the opening 882, i.e., the opening disposed clockwise with respect to the associated inner track section 861. The other coins will be handled in a like manner with a U.S. 1 cent piece falling into the opening 883, a small token falling into the opening 884, the U.S. 5 cent piece falling into the opening 885, a large token falling into the opening 886, and a U.S. 25 cent piece falling into the opening 887. As each coin falls through an opening 882 to 887, it is sensed by the corresponding light emitting diode 892 and 897 to be sensed and registered thereby in the fare box data collection system described above. U.S. 50 cent pieces will still be carried with the inner edge on the upper surface 841 past the inner track section 867 and into the opening 88, the U.S. 50 cent piece falling through the opening 888 and past the the associated light emitting diode 898 to be counted thereby.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A slowdown mechanism for use in a fare collection system utilizing an air stream to convey the contents of the fare box to a storage vault, said slowdown mechanism comprising a slowdown chamber, a perforated conduit disposed in said slowdown chamber and having an inlet for receiving the air stream carrying the contents of a fare box and an outlet for communication with a storage vault, the longitudinal axis of said perforated conduit being inclined to the horizontal with the inlet disposed higher than the outlet, a paper-air conduit connected to said perforated conduit intermediate the ends thereof and extending upwardly therefrom and outside said slowdown chamber for receiving a portion of the air stream and any paper drawn from the associated fare box, said paper-air conduit including a paper chamber disposed externally of said slowdown chamber, means providing communication between said paper chamber and said slowdown chamber and permitting passage of air therebetween but preventing passage of paper therebetween, a coin collecting chamber at the outlet of said perforated conduit for collecting any coins from the associated fare box, and a door on said collection chamber for permitting discharge of the coins therefrom into the associated storage vault.

2. The slowdown mechanism set forth in claim 1, and further comprising a valve mounted on said slowdown chamber between said paper-air conduit and said door and operative in the open position thereof to connect the interior of said slowdown chamber to atmosphere to increase the flow of air through said paper-air conduit.

3. The slowdown mechanism set forth in claim 2, and further comprising control mechanism for opening said valve and said door while conveying paper from the associated fare box to said slowdown chamber and for closing said valve and said door while conveying coins from the associated fare box to said slowdown chamber and to open said valve and to open said door when passing the coins from said slowdown chamber to the associated storage vault.

4. A slowdown mechanism for use in a fare collection system utilizing an air stream to convey the coin and paper contents of the fare box to a storage vault, said slowdown mechanism comprising a slowdown chamber having an inlet for receiving the air stream carrying the contents of a fare box and an outlet for communication with a storage vault, the longitudinal axis of said slowdown chamber being inclined to the horizontal with the inlet disposed higher than the outlet, a paper-air conduit connected to said slowdown chamber intermediate the ends thereof and extending upwardly therefrom for receiving a portion of the air stream and any paper drawn from the associated fare box, a door at the outlet of said slowdown chamber for collecting any coin from the associated fare box, a valve mounted on said slowdown chamber between said paper-air conduit and said door and operative in the open position thereof to connect the interior of said slowdown chamber to atmosphere to increase the flow of air through said paper-air conduit, a motor for periodically opening and said door to discharge the coins into the associated storage vault and to control the flow of air through said paper-air conduit, and automatic control mechanism for opening said valve and said door while conveying paper from the associated fare box to said slowdown chamber and for closing said valve and said door while conveying coins from the associated fare box to said slowdown chamber and to open said valve and to open said door when passing the coins from said slowdown chamber to the associated storage vault.

5. The slowdown mechanism set forth in claim 4, and further comprising a paper slower-separator connected between said paper-air conduit and the associated storage vault for slowing down the paper and separating the paper from the air stream.

* * * * *